(12) United States Patent
Isechi

(10) Patent No.: US 9,546,579 B2
(45) Date of Patent: Jan. 17, 2017

(54) ENGINE AND STRADDLE-TYPE VEHICLE INCLUDING THE SAME

(71) Applicant: YAMAHA HATSUDOKI KABUSHIKI KAISHA, Iwata-shi (JP)

(72) Inventor: Tetsuji Isechi, Iwata (JP)

(73) Assignee: YAMAHA HATSUDOKI KABUSHIKI KAISHA, Iwata-Shi (JP)

( * ) Notice: Subject to any disclaimer, the term of this patent is extended or adjusted under 35 U.S.C. 154(b) by 112 days.

(21) Appl. No.: 14/511,265

(22) Filed: Oct. 10, 2014

(65) Prior Publication Data
US 2015/0114327 A1  Apr. 30, 2015

(30) Foreign Application Priority Data
Oct. 30, 2013 (JP) ................................ 2013-225184

(51) Int. Cl.
*F01M 13/04* (2006.01)
*F16H 57/027* (2012.01)
*F16H 57/02* (2012.01)

(52) U.S. Cl.
CPC ............ *F01M 13/04* (2013.01); *F16H 57/027* (2013.01); *F16H 2057/0203* (2013.01); *F16H 2057/02065* (2013.01)

(58) Field of Classification Search
CPC ...... F01M 13/04; F01M 13/00; F01M 13/021; F01M 1/04; F01M 1/16; F01M 1/10; F01M 9/10; F02B 75/22
USPC ...................... 123/41.86, 572, 196 R, 196 A, 196 CP, 123/196 M
See application file for complete search history.

(56) References Cited

U.S. PATENT DOCUMENTS

| 4,844,032 | A | 7/1989 | Groeger et al. |
| 6,425,451 | B2 * | 7/2002 | Yoshida ................. F01M 13/04 123/572 |
| 6,834,643 | B2 * | 12/2004 | Hori ..................... F01M 13/022 123/572 |
| 7,051,721 | B2 * | 5/2006 | Tomita ................. F01M 13/021 123/572 |
| 7,055,509 | B2 * | 6/2006 | Hara .................... F01M 13/022 123/572 |

(Continued)

FOREIGN PATENT DOCUMENTS

| DE | 10108771 A1 | 9/2001 |
| EP | 0287756 A2 | 10/1988 |
| JP | 4717795 B2 | 7/2011 |

OTHER PUBLICATIONS

Extended European Search Report dated Mar. 25, 2015.

*Primary Examiner* — Long T Tran
(74) *Attorney, Agent, or Firm* — Rabin & Berdo, P.C.

(57) ABSTRACT

An engine 40 includes a breather device 20 and an oil passage defining member 30 disposed in the breather device 20. The breather device 20 includes a breather main body 22 integral with a crankcase 50, and a breather cover 24. The breather main body 22 and the breather cover 24 define an enclosed space 26 in communication with an inner space of the crankcase 50. The oil passage defining member 30 includes a first member 32 integral with the crankcase 50, and a second member 34. The first and second members 32 and 34 define an oil passage 38. The crankcase 50 includes a transmission chamber 60 in which a main shaft 72 and a drive shaft 74 are disposed, and oil feed holes 82A to 82C through which the oil passage 38 and the transmission chamber 60 are in communication with each other.

13 Claims, 18 Drawing Sheets

(56) References Cited

U.S. PATENT DOCUMENTS

| | | | |
|---|---|---|---|
| 7,669,573 B2* | 3/2010 | Ogasawara | B62J 25/00 123/192.1 |
| 2001/0050193 A1 | 12/2001 | Yoshida et al. | |
| 2007/0000729 A1 | 1/2007 | Lund et al. | |
| 2007/0095335 A1 | 5/2007 | Matsuda | |
| 2007/0251225 A1* | 11/2007 | Doherty | F01M 13/04 60/311 |
| 2009/0301449 A1* | 12/2009 | Ogawa | F01M 13/022 123/574 |

* cited by examiner

ENGINE AND STRADDLE-TYPE VEHICLE INCLUDING THE SAME

CROSS-REFERENCE TO RELATED APPLICATIONS

This application claims priority from Japanese Patent Application No. 2013-225184, filed on Oct. 30, 2013, which is incorporated by reference herein in its entirety.

TECHNICAL FIELD

The present invention relates to engines and straddle-type vehicles including the engines.

BACKGROUND ART

In an engine of a motorcycle, for example, an oil passage is conventionally provided inside a crankcase containing a crankshaft, inside a cylinder body disposed on the crankcase, and inside a cylinder head disposed above the crankcase. A transmission is disposed inside the crankcase. The transmission includes a main shaft and a drive shaft which rotate by receiving a driving force from the crankshaft. Oil is allowed to flow through the oil passage, thus lubricating the main shaft and the drive shaft. Japanese Patent No. 4717795 discloses an engine in which an oil pipe is assembled into the crankcase. The oil pipe is separate from the crankcase, and an oil passage through which oil flows is provided inside the oil pipe. The oil pipe is provided with an oil ejection hole from which oil is ejected toward the main shaft and the drive shaft.

SUMMARY OF INVENTION

Technical Problem

However, when the oil pipe separate from the crankcase is assembled into the crankcase as disclosed in Japanese Patent No. 4717795, the oil pipe has to be machined with precision in order to ensure assembly precision. Therefore, the oil pipe itself might be relatively expensive, resulting in an increase in cost. For example, when an oil passage is provided inside a crankcase so as to be integral therewith, the oil passage has to be provided by casting. However, the oil passage provided by casting has a linear shape. More specifically, when the oil passage is provided by casting, it is difficult for the oil passage to have a shape other than a linear shape, and thus the oil passage unfortunately has low flexibility in shape.

Accordingly, preferred embodiments of the present invention provide an engine that allows an oil passage to have high flexibility in shape while preventing increases in the number of components and manufacturing cost.

Solution to Problem

The inventor of the present invention has realized that an oil passage has high flexibility in shape when a portion of the oil passage is integral with a crankcase and the other portion of the oil passage is separate from the crankcase. However, when a portion of an oil passage is separate from a crankcase, oil flowing through the oil passage might undesirably leak outside of the crankcase. After conducting various studies, the inventor of the present invention has found out that the above-mentioned problems are solved by providing an oil passage inside a breather device by which oil contained in blowby gas is separated.

An engine according to a preferred embodiment of the present invention includes: a crankcase including a transmission chamber; a crankshaft disposed in the crankcase; a transmission including a main shaft that is disposed in the transmission chamber of the crankcase and is configured to receive a driving force from the crankshaft to thereby rotate, and a drive shaft that is disposed in the transmission chamber of the crankcase and is configured to receive a driving force from the main shaft to thereby rotate; a breather device including a breather main body integral with the crankcase, and a breather cover separate from the breather main body and configured to attach to the breather main body, the breather main body and the breather cover defining an enclosed space in communication with an inner space of the crankcase, the breather device being arranged to separate oil contained in blowby gas flowing into the enclosed space and return the separated oil to the crankcase; and an oil passage defining member disposed in the breather device, including a first member integral with the crankcase, and a second member separate from the first member and configured to attach to the first member, the first member and the second member defining an oil passage through which the oil flows, the oil passage being in communication with the transmission chamber through an oil feed hole of the crankcase.

In the engine according to the preferred embodiment of the present invention, the oil passage defining member that defines the oil passage includes the first and second members. The first member is integral with the crankcase, and the second member is separate from the crankcase. Thus, it is unnecessary to make the entire oil passage separate from the crankcase, resulting in a reduction in cost. According to this preferred embodiment, the oil passage has higher flexibility in shape than when the oil passage is provided inside the crankcase so as to be integral therewith. The oil passage defining member is disposed inside the breather device. Thus, even if oil leaks from between the first and second members, the oil flows into the enclosed space of the breather device. Hence, the oil is prevented from leaking out of the breather device. The oil that has flowed into the enclosed space of the breather device is returned to the crankcase together with oil separated from blowby gas, and therefore, it is unnecessary to additionally provide an oil return member.

According to another preferred embodiment of the present invention, the engine may further include a clutch to which a torque of the crankshaft is transmitted. The breather device may include a breather chamber, through which the oil contained in blowby gas is separated, formed in the enclosed space. The crankcase may further include: a clutch chamber in which the clutch is disposed and through which the oil flows; and a breather chamber inlet through which the clutch chamber and the breather chamber are in communication with each other and blowby gas is guided from the clutch chamber to the breather chamber. The oil passage defining member may partition the breather chamber into a first breather chamber that includes the breather chamber inlet, and a second breather chamber that is in communication with the first breather chamber and that does not include the breather chamber inlet.

When the blowby gas in the clutch chamber flows into the breather chamber through the breather chamber inlet, the oil flowing through the clutch chamber might also flow into the breather chamber together with the blowby gas. However, movement of most of the oil that will flow into the breather chamber is inhibited by the oil passage defining member located between the first and second breather chambers. Therefore, the oil is inhibited from flowing into the second breather chamber. As a result, the oil passage defining member is effectively utilized not only as a member that defines the oil passage but also as a member that inhibits the oil from flowing into the second breather chamber.

According to still another preferred embodiment of the present invention, the breather main body may include an oil return hole formed therein, through which the breather chamber and the transmission chamber are in communication with each other. The oil return hole may be located lower than a connection position between the first member and the second member of the oil passage defining member.

Thus, the oil separated from the blowby gas inside the breather chamber is returned to the transmission chamber without providing a separate pipe through which the breather chamber and the transmission chamber are in communication with each other. The oil return hole is located lower than the connection position between the first and second members. As a result, even if oil leaks from between the first and second members, the oil trickles down and then returns to the transmission chamber through the oil return hole.

According to yet another preferred embodiment of the present invention, the main shaft may include a first end portion and a second end portion. The clutch may be attached to the second end portion of the main shaft. The oil passage defining member may extend from a first end portion of the breather device, adjacent to the first end portion of the main shaft, toward a second end portion of the breather device adjacent to the second end portion of the main shaft. The oil passage defining member may include a bent portion that extends away from the clutch in a direction substantially perpendicular to the main shaft, as the bent portion extends toward the second end portion of the breather device adjacent to the second end portion.

Thus, a volume of the first breather chamber is larger than when the entire oil passage defining member has a linear shape without any bent portion. Therefore, the blowby gas easily flows into the breather chamber from the clutch chamber. The oil passage defining member is more compactly disposed than when the entire oil passage defining member has a linear shape.

According to still yet another preferred embodiment of the present invention, a lower surface of the breather chamber may extend downward as the lower surface extends from the oil passage toward the oil return hole.

Thus, the oil separated from the blowby gas inside the breather chamber is easily guided into the oil return hole. Even if oil leaks from between the first and second members, the oil is easily returned to the transmission chamber through the oil return hole.

According to another preferred embodiment of the present invention, the first member of the oil passage defining member may include an upper surface, and the second member of the oil passage defining member may include a lower surface that faces the upper surface.

Thus, the oil passage defined by the first and second members is easily provided, thus increasing layout flexibility of the oil passage.

According to still another preferred embodiment of the present invention, the engine may further include a gasket located between the upper surface and the lower surface. The first member of the oil passage defining member and the gasket may define a first oil passage through which the oil flows. The second member of the oil passage defining member and the gasket may define a second oil passage through which the oil flows. The oil feed hole may be in communication with the first oil passage. The gasket may include an oil restriction hole formed therein, through which the first oil passage and the second oil passage are in communication with each other.

Thus, a flow rate of the oil that flows from the second oil passage into the first oil passage is adjusted through the oil restriction hole provided in the gasket.

According to yet another preferred embodiment of the present invention, the breather device may include a bolt insertion hole formed therein, into which a bolt is insertable to fix the first member and the second member to each other. An outer wall that defines the bolt insertion hole may be disposed in the enclosed space.

Thus, a contact pressure applied to the gasket located between the first and second members is increased so as to enhance sealing ability of the oil passage. As a result, oil leakage from between the first and second members is inhibited.

According to still yet another preferred embodiment of the present invention, the second member of the oil passage defining member may be integral with the breather cover.

The second member and the breather cover are integral with each other in this manner, thus reducing the number of components and resulting in a cost reduction.

According to another preferred embodiment of the present invention, the first member of the oil passage defining member may be disposed in the breather main body. A groove may be formed between the first member and an inner wall of the breather main body.

Thus, even when oil leaks out from between the first and second members, the oil flows into the groove. As a result, the oil is reliably prevented from leaking outside of the breather device.

According to still another preferred embodiment of the present invention, the first member of the oil passage defining member may define a portion of an outer wall of the breather main body.

Thus, the first member is provided easily and simplified in structure.

According to yet another preferred embodiment of the present invention, the oil feed hole may be located higher than at least one of the main shaft and the drive shaft.

Thus, oil is dropped from the oil feed hole, thus easily supplying the oil to at least one of the main shaft and the drive shaft.

A straddle-type vehicle according to a preferred embodiment of the present invention includes the engine described above.

Thus, the preferred embodiment of the present invention provides a straddle-type vehicle that achieves the above-described effects.

Advantageous Effects of Invention

Various preferred embodiments of the present invention provide an engine that allows an oil passage to have high flexibility in shape while preventing increases in the number of components and the manufacturing cost.

DESCRIPTION OF EMBODIMENTS

Figure 1:
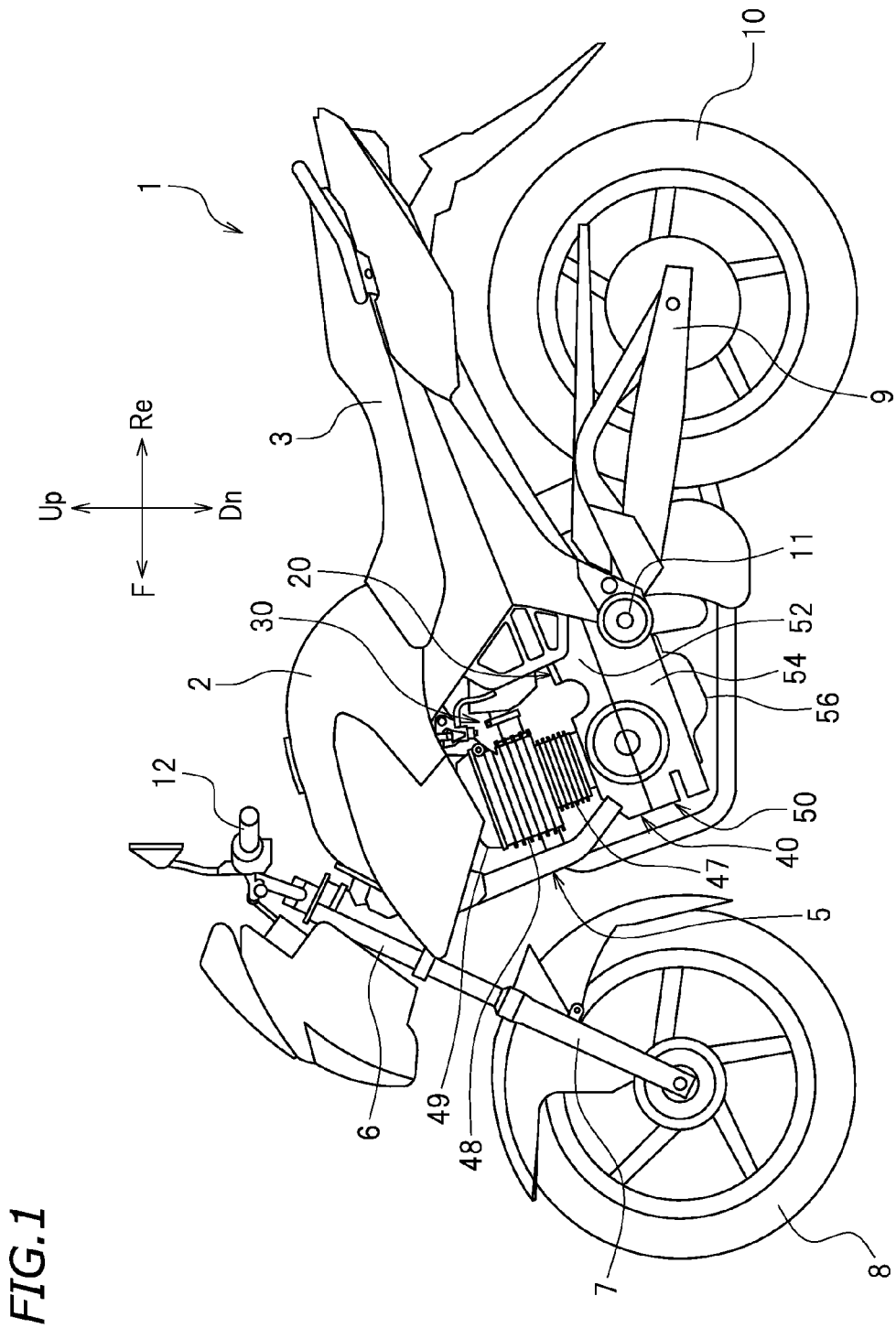
FIG. 1 is a left side view illustrating a motorcycle according to a preferred embodiment of the present invention.

Hereinafter, preferred embodiments of the present invention will be described. As illustrated in FIG. 1, a straddle-type vehicle according to the present embodiment is a motorcycle 1. The motorcycle 1 is not limited to any particular type of motorcycle, but may be any type of motorcycles such as a "scooter-type", "moped-type", "off-road" or "street" motorcycle, for example. The straddle-type vehicle according to the present invention is not limited to a motorcycle, but may be an ATV (All Terrain Vehicle) or a four-wheel buggy, for example. As used herein, the term "straddle-type vehicle" refers to a vehicle that a rider straddles when getting on the vehicle.

In the following description, unless otherwise noted, the terms "front", "rear", "right", "left", "up" and "down" refer to front, rear, right, left, up and down with respect to a rider sitting on a seat 3 of the motorcycle 1, respectively. The terms "up" and "down" refer to a vertically upward direction and a vertically downward direction when the motorcycle 1 is brought to a stop on a horizontal plane, respectively. Reference signs "F", "Re", "R", "L", "Up" and "Dn" in the drawings represent front, rear, right, left, up and down, respectively. The above-mentioned directions are also used to describe components of an engine 40. Specifically, the terms "front", "rear", "right", left, "up" and "down" used to describe the engine 40 installed on the motorcycle 1 refer to front, rear, right, left, up and down with respect to the rider, respectively.

As illustrated in FIG. 1, the motorcycle 1 may include a head pipe 6 and a body frame 5. The body frame 5 may include a main frame (not illustrated) that extends rearward from the head pipe 6 through a region below a fuel tank 2. The body frame 5 may further include a seat frame (not illustrated) that extends obliquely upward and rearward from the main frame. The head pipe 6 supports a steering shaft (not illustrated). An upper portion of the steering shaft is provided with a handlebar 12. A lower portion of the steering shaft is provided with a front fork 7. A front wheel 8 is rotatably supported by a lower end portion of the front fork 7. The fuel tank 2 is disposed behind the head pipe 6, and the seat 3 is disposed behind the fuel tank 2. The fuel tank 2 is supported by the main frame. The seat 3 is supported by the seat frame. A rear arm 9 is supported by a pivot shaft 11 so as to be swingable up and down around the pivot shaft 11. A rear wheel 10 is rotatably supported by a rear end portion of the rear arm 9.

The motorcycle 1 may include the engine 40 that is an internal combustion engine. The engine 40 is supported by the body frame 5 so as not to be swingable. The engine 40 may include a crankcase 50, a cylinder body 47, a cylinder head 48, and a cylinder head cover 49. The cylinder body 47 extends upward from a front portion of the crankcase 50. Note that the term "upward" is used herein in a broad sense, and therefore, the expression "to extend upward" may mean to extend vertically upward or may mean to extend in a direction inclined with respect to a vertical direction. In the present embodiment, the cylinder body 47 extends in a direction inclined forward with respect to a vertical direction. Alternatively, the cylinder body 47 may extend vertically upward. The cylinder head 48 is disposed on the cylinder body 47 and connected to the cylinder body 47. The cylinder head cover 49 is disposed on the cylinder head 48 and connected to the cylinder head 48.

Figure 4:
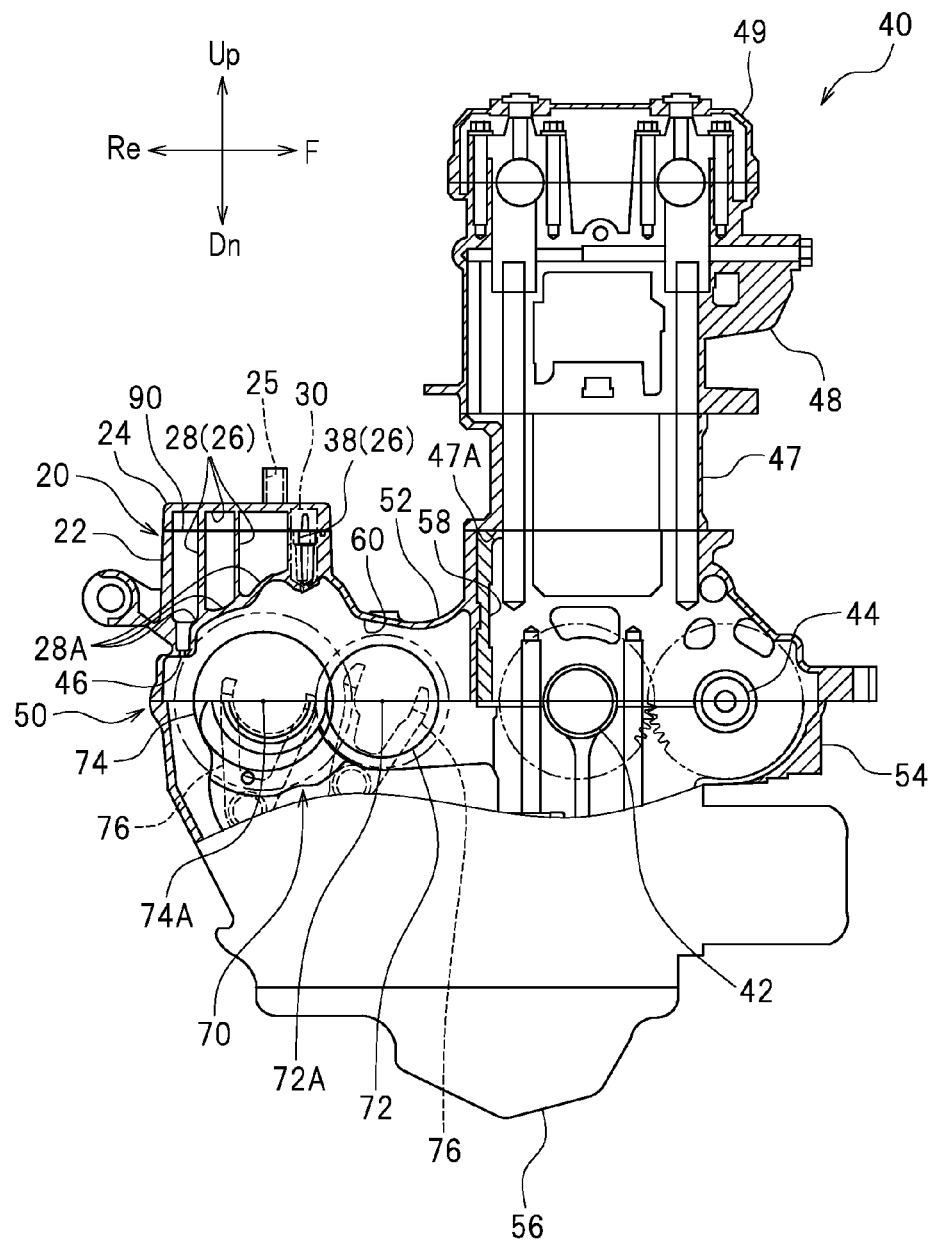
FIG. 4 is a cross-sectional view illustrating the engine according to the preferred embodiment of the present invention.

As illustrated in FIG. 4, the crankcase 50 may include: an upper crankcase 52; and a lower crankcase 54 located under the upper crankcase 52. An oil pan 56 is disposed under the lower crankcase 54. The oil pan 56 collects oil that has flowed through the engine 40. The lower crankcase 54 and the oil pan 56 are connected to each other. In the present embodiment, the cylinder body 47 and the upper crankcase 52 are separately molded. Alternatively, the cylinder body 47 and upper crankcase 52 may be integral with each other.

Figure 2:
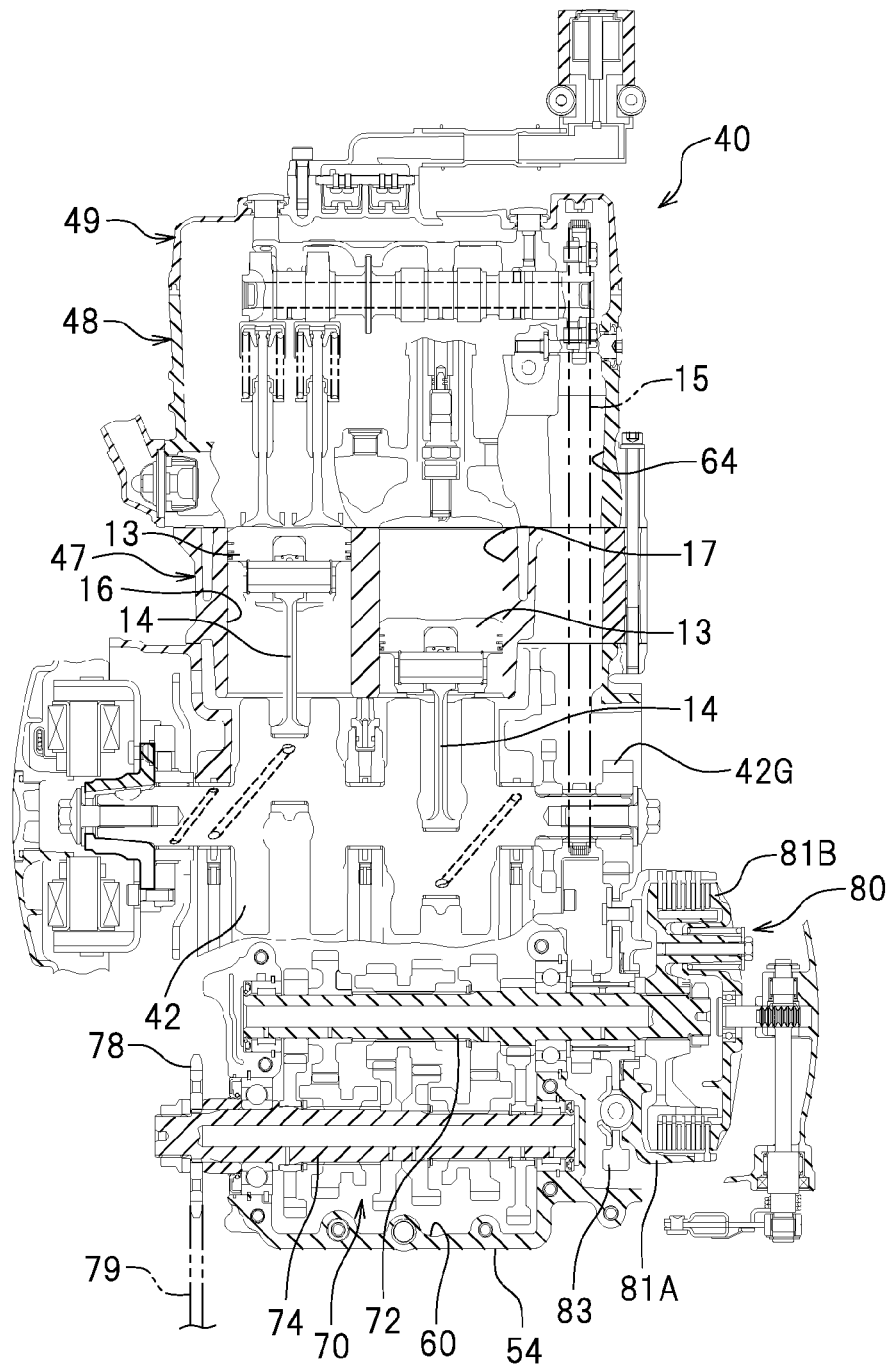
FIG. 2 is a cross-sectional view illustrating a portion of an engine according to the preferred embodiment of the present invention.

As illustrated in FIG. 2, a first cylinder 16 and a second cylinder 17 are provided inside the cylinder body 47. The first and second cylinders 16 and 17 extend upward from a front portion of the upper crankcase 52 (see FIG. 1). The engine 40 is a two cylinder engine. Each of the first and second cylinders 16 and 17 contains a piston 13. Each piston 13 is connected to a crankshaft 42 via a connecting rod 14. Although the engine 40 according to the present embodiment is a two cylinder engine including two cylinders, i.e., the first and second cylinders 16 and 17, the engine 40 may be a single cylinder engine including a single cylinder or may be a multi-cylinder engine including three or more cylinders.

Figure 3:
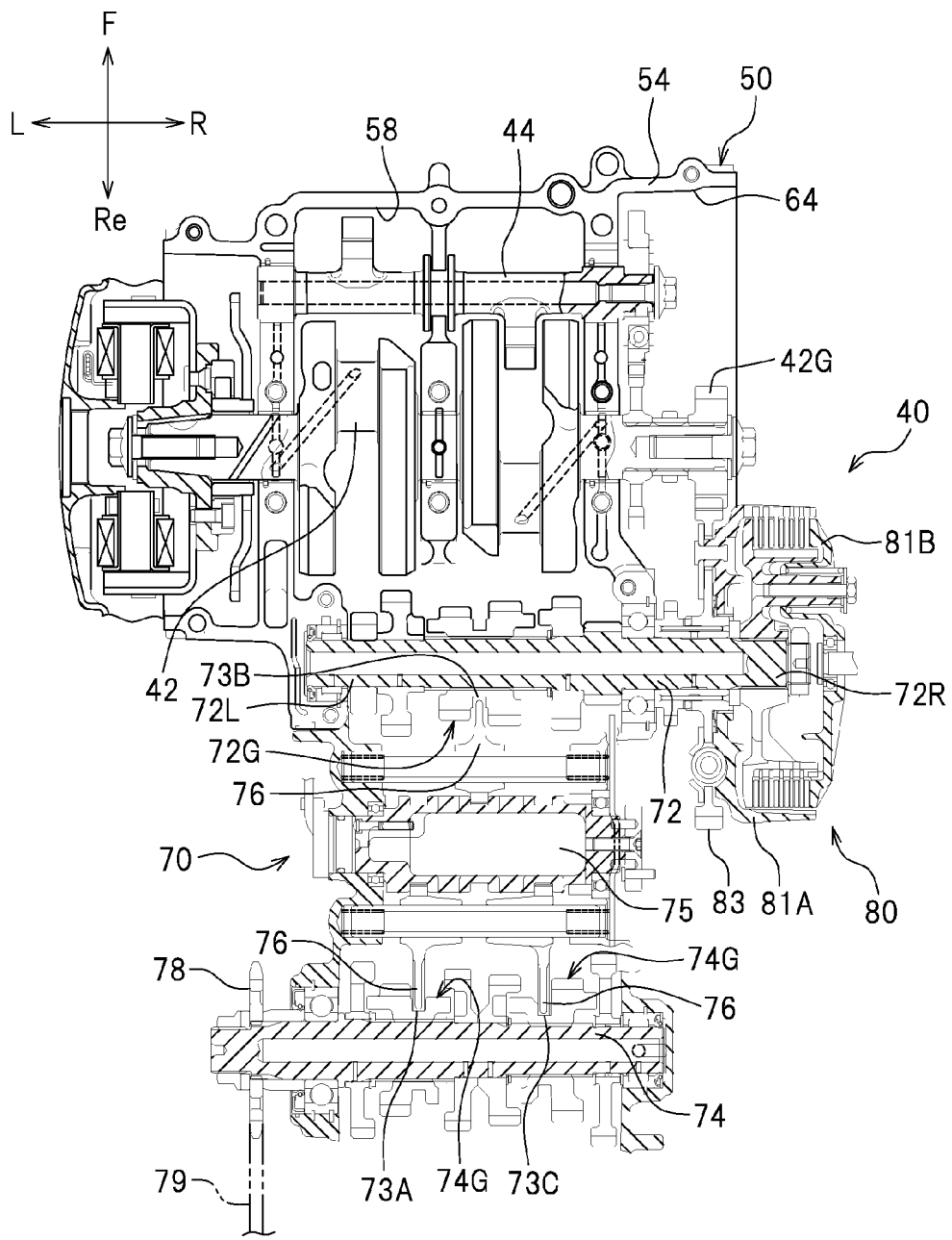
FIG. 3 is a cross-sectional view illustrating the engine according to the preferred embodiment of the present invention.

As illustrated in FIG. 3, the engine 40 may include: the crankshaft 42; a balancer shaft 44 located forward relative to the crankshaft 42; a transmission 70 located rearward relative to the crankshaft 42; and a clutch 80 to which a torque of the crankshaft 42 is transmitted. The crankshaft 42 extends from a first position to a second position. In the present embodiment, the first position is a leftward position, and the second position is a rightward position. The crankshaft 42 and the balancer shaft 44 are disposed inside the crankcase 50. The transmission 70 may include: a main shaft 72 located rearward relative to the crankshaft 42; and a drive shaft 74 located rearward relative to the main shaft 72. The main shaft 72 is disposed inside the crankcase 50. The main shaft 72 rotates by receiving a driving force from the crankshaft 42. The main shaft 72 may include a right end portion 72R and a left end portion 72L. The clutch 80 (which will be described later) is attached to the right end portion 72R of the main shaft 72. Alternatively, the clutch 80 may be attached to the left end portion 72L of the main shaft 72. The drive shaft 74 is disposed inside the crankcase 50. The drive shaft 74 rotates by receiving a driving force from the crankshaft 42 via the main shaft 72.

Figure 5:
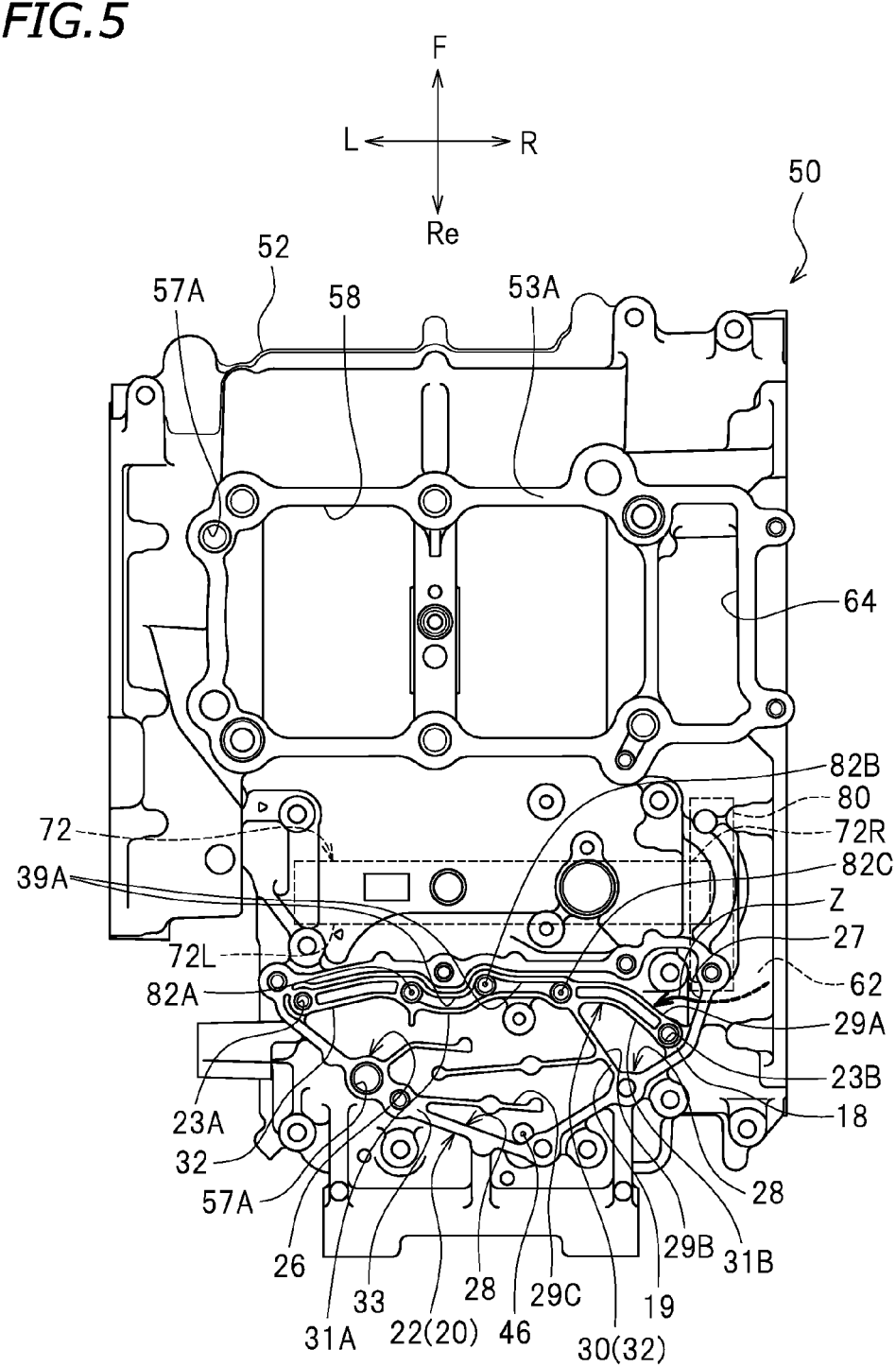
FIG. 5 is a plan view of an upper crankcase according to the preferred embodiment of the present invention.

As illustrated in FIG. 4, the crankcase 50 is provided with: a crank chamber 58 in which the crankshaft 42 is disposed; a clutch chamber 62 (see FIG. 5) in which the clutch 80 (see FIG. 2) is disposed; a transmission chamber 60 in which the transmission 70 is disposed; and a cam chain chamber 64 (see FIG. 2) in which a cam chain 15 (see FIG. 2) is disposed. The main shaft 72 and the drive shaft 74 are disposed in the transmission chamber 60. The crank chamber 58 and the clutch chamber 62 are in communication with each other. The crank chamber 58 and the transmission chamber 60 are in communication with each other. The transmission chamber 60 is disposed rearward relative to the crank chamber 58. The oil pan 56 is disposed below the transmission chamber 60. Oil flows through the crank chamber 58, the clutch chamber 62, the cam chain chamber 64, and the transmission chamber 60. As illustrated in FIG. 5, the clutch chamber 62 is located rightward of an oil passage defining member 30 (which will be described later). Alternatively, the clutch chamber 62 may be located leftward of the oil passage defining member 30.

As illustrated in FIG. 3, the clutch 80 may include a clutch housing 81A and a clutch boss 81B. The clutch housing 81A is connected to a gear 83. The gear 83 intermeshes with a crank gear 42G fixed to the crankshaft 42. Therefore, the clutch housing 81A of the clutch 80 is connected to the crankshaft 42. The main shaft 72 is fixed to the clutch boss 81B. The main shaft 72 is provided with a plurality of gears 72G, and the drive shaft 74 is provided with a plurality of gears 74G. The transmission 70 may include a shift drum 75 and a shift fork 76. The shift fork 76 moves at least one of the gears 72G and 74G, thus changing a combination of the gears 72G and 74G intermeshing each other. As a result, a transmission gear ratio is changed. A sprocket 78 is attached to a left end portion of the drive shaft 74. The sprocket 78 and the rear wheel 10 (see FIG. 1) are connected to each other through a chain 79. The torque of the crankshaft 42 which has been transmitted to the drive shaft 74 is transmitted to the rear wheel 10 via the chain 79. Note that a mechanism to transmit power from the drive shaft 74 to the rear wheel 10 is not limited to the chain 79, but may be a transmission belt, a drive shaft, a gear mechanism or any other mechanism. In FIG. 1, the chain 79 is not illustrated.

As illustrated in FIG. 4, the engine 40 may further include a breather device 20. The breather device 20 is disposed rearward relative to the cylinder body 47. The breather device 20 is disposed rearward relative to the first and second cylinders 16 and 17 (see FIG. 2). The breather device 20 is disposed rearward relative to a shaft center 72A of the main shaft 72. The breather device 20 separates oil contained in blowby gas and returns the separated oil to the crankcase 50. The breather device 20 may include a breather main body 22 and a breather cover 24. The breather main body 22 is integral with the crankcase 50. Specifically, the breather main body 22 is integral with the upper crankcase 52. Therefore, a length of the engine 40 in an up-down direction is shorter than when the breather main body 22 is provided in the cylinder head 48. The breather device 20 is disposed lower than the cylinder head 48. The breather cover 24 is separate from the breather main body 22. The breather cover 24 is separate from the crankcase 50. The breather cover 24 is attached to the breather main body 22. The breather cover 24 is located on or above the breather main body 22. An enclosed space 26 is defined by the breather main body 22 and the breather cover 24. The enclosed space 26 is in communication with an inner space of the crankcase 50. In the enclosed space 26, a breather chamber 28 through which oil contained in blowby gas is separated is defined. The enclosed space 26 may include the breather chamber 28 and an oil passage 38 (which will be described later).

Figure 6:
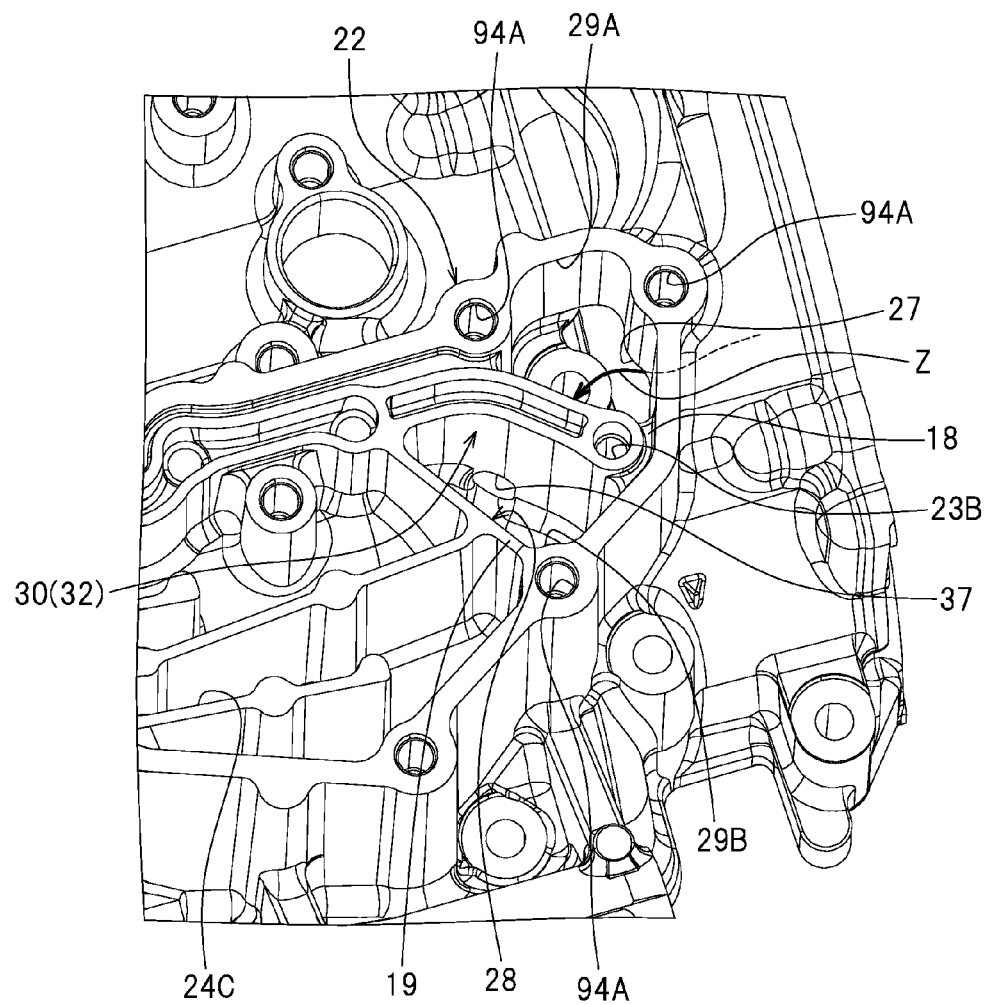
FIG. 6 is a perspective view of a breather main body according to the preferred embodiment of the present invention.

As illustrated in FIG. 5, the crankcase 50 is provided with a breather chamber inlet 27 through which the clutch chamber 62 and the breather chamber 28 are in communication with each other. The breather chamber inlet 27 is located between a rear end portion of the clutch chamber 62 and a right end portion of the breather device 20. The breather chamber inlet 27 is located forward relative to a rear end of the oil passage defining member 30 (which will be described later). Blowby gas that flows through the clutch chamber 62 is guided into the breather chamber 28 through the breather chamber inlet 27. The breather chamber 28 may include: a first breather chamber 29A that includes the breather chamber inlet 27; a second breather chamber 29B that does not include the breather chamber inlet 27; and a third breather chamber 29C that includes a discharge hole 25 (see FIG. 8) which will be described later. The oil passage defining member 30 (which will be described later) serves as a partition between the first and second breather chambers 29A and 29B. As illustrated in FIG. 6, the oil passage defining member 30 is provided with a groove 18 and a communication hole 37 through which the blowby gas flows from the first breather chamber 29A to the second breather chamber 29B.

Figure 7:
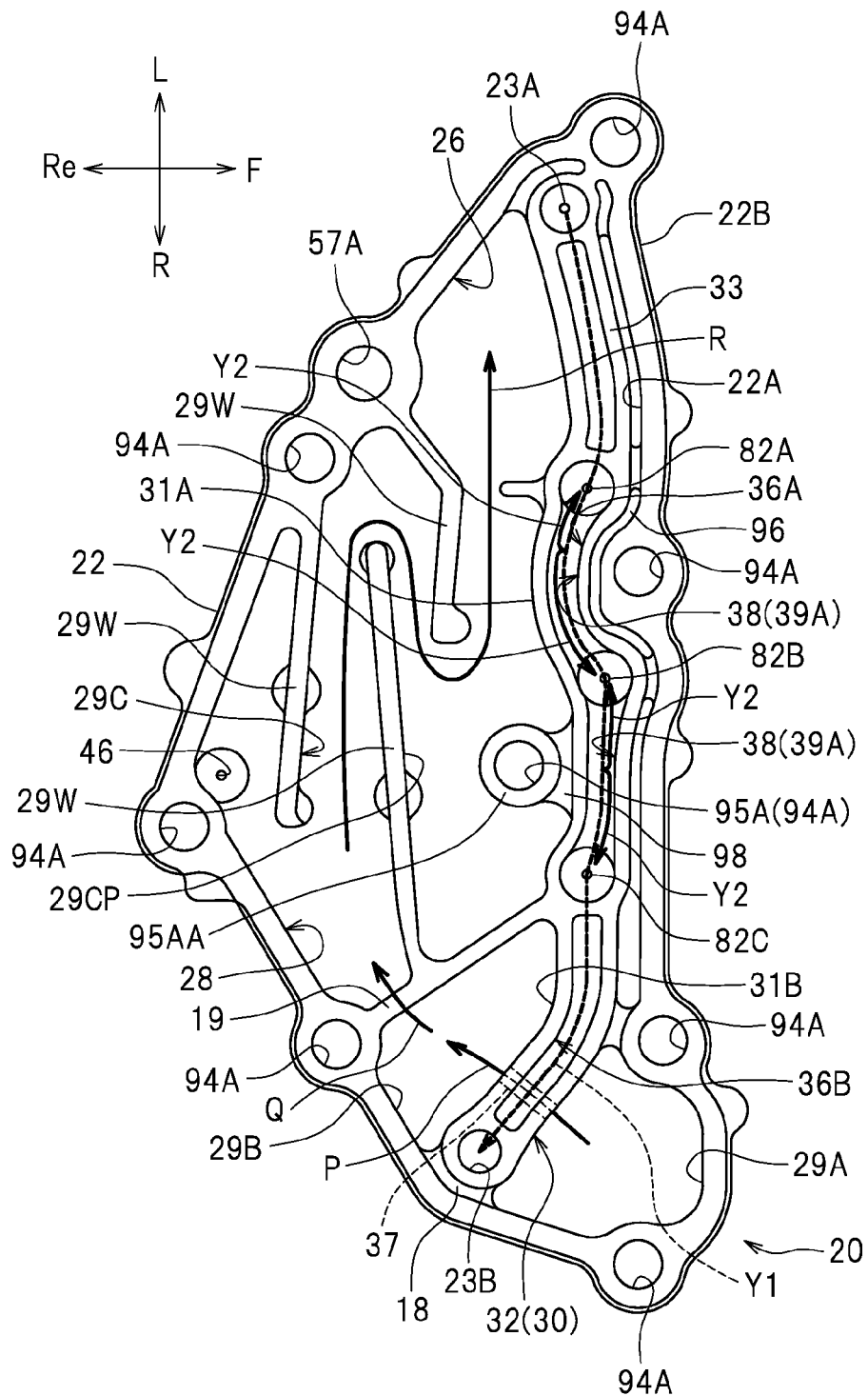
FIG. 7 is a plan view of the breather main body according to the preferred embodiment of the present invention.

Oil that flows through the clutch chamber 62 may flow into the first breather chamber 29A through the breather chamber inlet 27. However, the oil passage defining member 30 is located between the first and second breather chambers 29A and 29B. Hence, as indicated by an arrow Z in FIG. 6, the oil that flows through the clutch chamber 62 is inhibited from flowing into the second breather chamber 29B by the oil passage defining member 30. In this case, as indicated by an arrow P in FIG. 7, the blowby gas that has flowed into the first breather chamber 29A from the clutch chamber 62 (see FIG. 5) flows into the second breather chamber 29B through the communication hole 37 of the oil passage defining member 30. As illustrated in FIG. 7, the breather main body 22 is provided with a partition wall 19 (see also FIG. 6) which serves as a partition between the second breather chamber 29B and the third breather chamber 29C. Therefore, the blowby gas that has flowed into the second breather chamber 29B flows upward into the breather cover 24 from inside the breather main body 22. Subsequently, as indicated by an arrow Q in FIG. 8, the blowby gas flows through the breather cover 24 to pass through a region above the partition wall 19 (see FIG. 7), and then flows into the third breather chamber 29C of the breather main body 22.

As illustrated in FIG. 7, a plurality of walls 29W are disposed in the third breather chamber 29C. A blowby gas passage 29CP through which the blowby gas flows through the third breather chamber 29C is defined by the walls 29W. The blowby gas passage 29CP has a labyrinthine structure. The blowby gas that has flowed into the third breather chamber 29C flows through the blowby gas passage 29CP as indicated by an arrow R in FIG. 7. The blowby gas flows through the blowby gas passage 29CP in a zigzag direction. Oil separated from the blowby gas through the third breather chamber 29C is guided from the blowby gas passage 29CP into an oil return hole 46 (which will be described later). Gas separated from the blowby gas through the third breather chamber 29C is guided into the discharge hole 25 (see FIG. 8). The plurality of walls 29W are provided in the third breather chamber 29C, thus successfully separating oil from the blowby gas through the third breather chamber 29C even though the third breather chamber 29C is compact in size.

Figure 9:
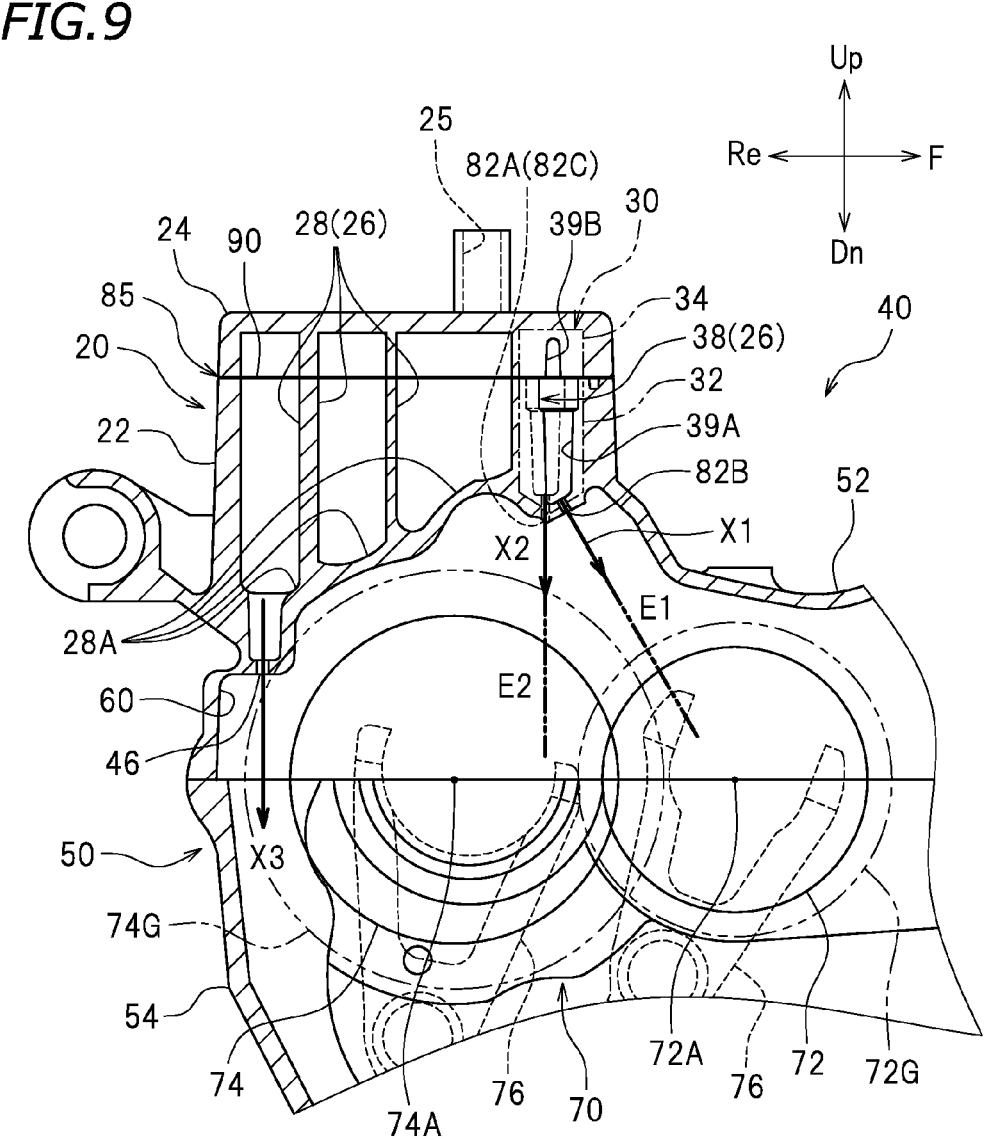
FIG. 9 is a cross-sectional view illustrating a portion of the engine according to the preferred embodiment of the present invention.

As illustrated in FIG. 9, the breather main body 22 is provided with the oil return hole 46 through which the breather chamber 28 and the transmission chamber 60 are in communication with each other. The oil return hole 46 is located lower than a connection position 85 between first and second members 32 and 34 (which will be described later). The oil return hole 46 is located lower than a gasket 90 (which will be described later). The oil return hole 46 is located rearward relative to the drive shaft 74. The oil return hole 46 is located in a rear end of the breather chamber 28. The oil return hole 46 is located inside the third breather chamber 29C (see FIG. 7). A lower surface 28A of the breather chamber 28 is inclined with respect to a horizontal direction so that the lower surface 28A extends downward as it extends rearward. The lower surface 28A of the breather chamber 28 may be inclined with respect to the horizontal direction so that the lower surface 28A extends downward as it extends from the oil passage 38 toward the oil return hole 46. The direction in which the lower surface 28A of the breather chamber 28 is inclined is not limited to any particular direction, but may be appropriately set in accordance with the position of the oil return hole 46. As indicated by an arrow X3 in FIG. 9, the oil inside the breather chamber 28 flows into the transmission chamber 60 through the oil return hole 46. The oil that has flowed into the transmission chamber 60 is collected into the oil pan 56 located below the transmission chamber 60.

Figure 8:
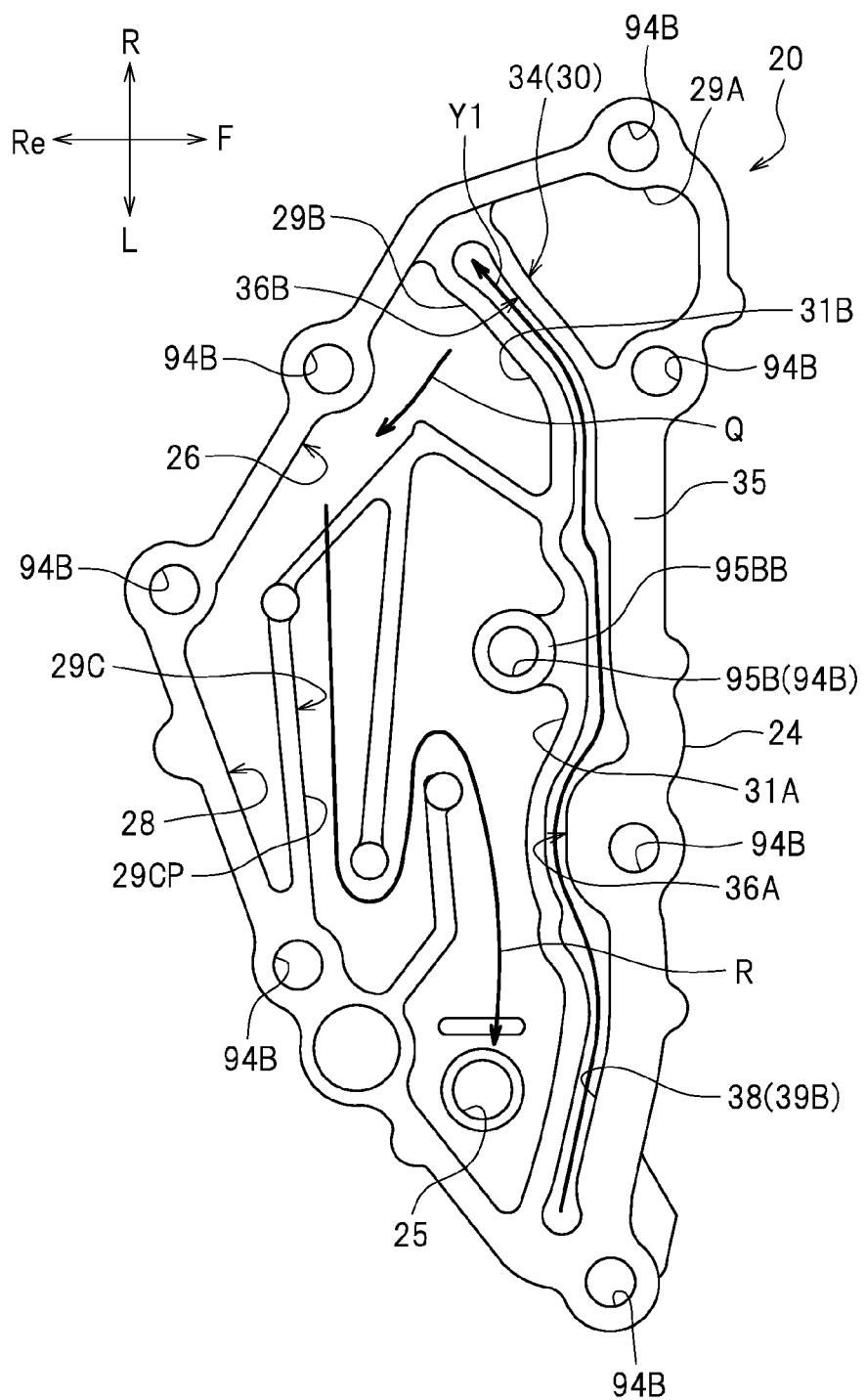
FIG. 8 is a bottom view of a breather cover according to the preferred embodiment of the present invention.

As illustrated in FIG. 8, the breather cover 24 is provided with the discharge hole 25 through which the gas inside the breather chamber 28 is discharged to the outside. The discharge hole 25 is in communication with the third breather chamber 29C. The gas inside the breather chamber 28 is gas that remains after separation of oil contained in the blowby gas. The gas inside the breather chamber 28 flows into an air cleaner (not illustrated) through the discharge hole 25. The discharge hole 25 is provided in a left end portion of the breather device 20. The discharge hole 25 is located inside the third breather chamber 29C.

As illustrated in FIG. 4, the engine 40 may further include the gasket 90 between the breather main body 22 and the breather cover 24 so that oil does not leak from the breather device 20. Thus, a gap between the breather main body 22 and the breather cover 24 is sealed.

As already mentioned above, the engine 40 may include the oil passage defining member 30. As illustrated in FIG. 9, the oil passage defining member 30 is disposed inside the breather device 20. As illustrated in FIG. 5, the oil passage defining member 30 extends from an end portion of the breather device 20 adjacent to the left end portion 72L of the main shaft 72 toward an end portion of the breather device 20 adjacent to the right end portion 72R of the main shaft 72. As illustrated in FIG. 9, the oil passage defining member 30 may include the first and second members 32 and 34. The first member 32 is integral with the crankcase 50. More specifically, the first member 32 is integral with the upper crankcase 52. As illustrated in FIG. 7, the first member 32 may include an upper surface 33. The first member 32 is integral with the breather main body 22 and disposed inside the breather main body 22. A groove 96 is provided between the first member 32 and an inner wall 22A of the breather main body 22. The groove 96 extends in a right-left direction in the breather main body 22 and is in communication with the first breather chamber 29A. Alternatively, the groove 96 may not be provided between the first member 32 and the inner wall 22A of the breather main body 22, and the first member 32 may define a portion of an outer wall 22B of the breather main body 22. The first member 32 may be integral with the upper crankcase 52, but the first member 32 and the breather device 20 may be separate components. In other words, the first member 32 and the breather main body 22 may be separate components.

As illustrated in FIG. 9, the second member 34 is separate from the first member 32. The second member 34 is integral with the breather cover 24 and disposed inside the breather cover 24. As illustrated in FIG. 8, the second member 34 may include a lower surface 35 that faces the upper surface 33 of the first member 32. As illustrated in FIG. 9, the second member 34 is attached to the first member 32 via the gasket 90. An upper surface of the gasket 90 is in contact with the lower surface 35 of the second member 34, and a lower surface of the gasket 90 is in contact with the upper surface 33 of the first member 32. The second member 34 is located above the first member 32. The second member 34 may be integral with the breather cover 24. Alternatively, the second member 34 and the breather cover 24 may be separate components.

As illustrated in FIG. 5, the oil passage defining member 30 may include a main body portion 31A and a bent portion 31B. The main body portion 31A is provided with oil feed holes 82A to 82C (which will be described later). The bent portion 31B is located rearward as it extends rightward. The bent portion 31B is located further away from the clutch 80 in a vehicle front-rear direction as the bent portion 31B extends toward the end portion of the breather device 20 adjacent to the right end portion 72R of the main shaft 72. The bent portion 31B is arranged so as to be closer to the oil return hole 46 as the bent portion 31B approaches the clutch chamber 62. Since the oil passage defining member 30 includes the bent portion 31B, a dimension of the oil passage defining member 30 in the right-left direction is reduced.

Figure 10:
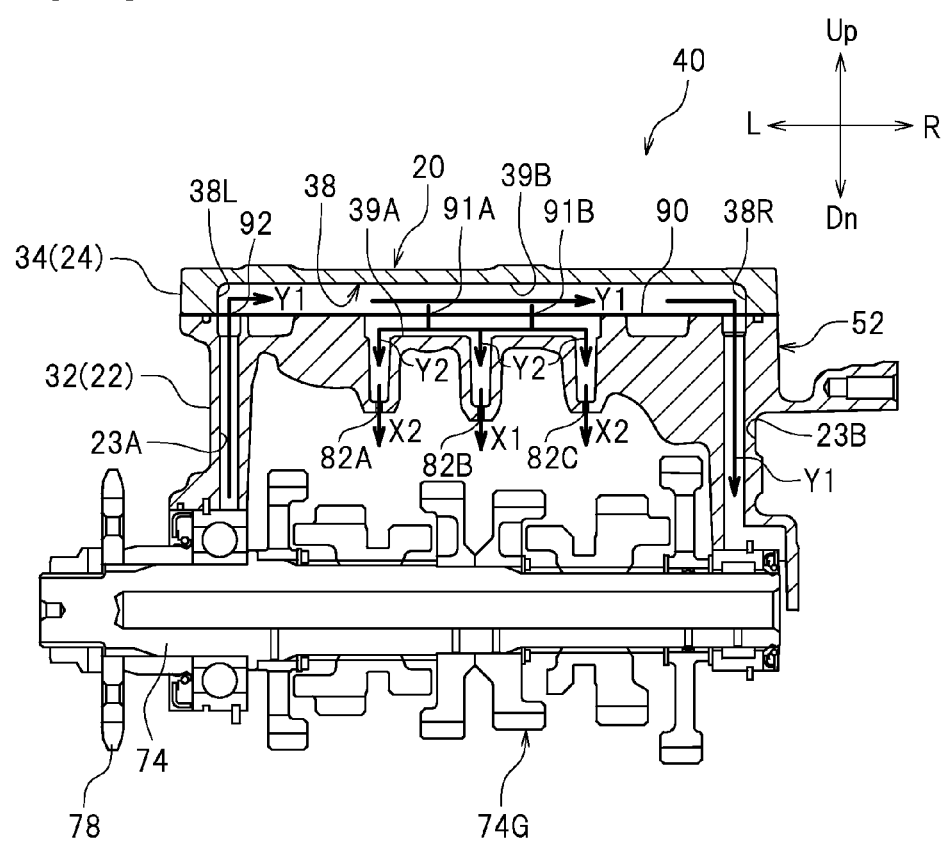
FIG. 10 is a cross-sectional view illustrating a breather device according to the preferred embodiment of the present invention.

As illustrated in FIG. 10, the engine 40 may include the oil passage 38 through which oil flows. The oil passage 38 is defined by the first and second members 32 and 34. The gasket 90 is located between the upper surface 33 (see FIG. 7) of the first member 32 and the lower surface 35 (see FIG. 8) of the second member 34. The oil passage 38 may include first and second oil passages 39A and 39B through which oil flows. The first oil passage 39A is defined by the first member 32 and the gasket 90. The second oil passage 39B is defined by the second member 34 and the gasket 90. Oil flow passage cross-sectional areas, for example, of the first and second oil passages 39A and 39B are adjusted by changing shapes of the first and second oil passages 39A and 39B. Thus, amounts of oil that flows through the oil passages 39A and 39B are adjusted. As illustrated in FIG. 8, the oil passage 38 extends from a first position to a second position, which means that the oil passage 38 extends from a leftward position to a rightward position. The oil passage 38 may include a curved portion 36A and a bent portion 36B. The curved portion 36A is curved so as to be protruded rearward. The bent portion 36B is located rearward as it extends rightward. The oil passage 38 includes the bent portion 36B, thus reducing a dimension of the oil passage 38 in the right-left direction. As illustrated in FIG. 7, the bent portion 36B may be arranged so that the bent portion 36B is closer to the oil return hole 46 as it approaches the clutch chamber 62 (see FIG. 5). A portion of the oil passage 38 is located between the breather chamber inlet 27 and the oil return hole 46 in a front-rear direction of the crankcase 50. Note that the shape of the oil passage 38 is not limited to the above-described shape. For example, the oil passage 38 may extend linearly in the right-left direction. As illustrated in FIG. 10, right and left ends 38R and 38L of the oil passage 38 are provided with no laterally-opened hole. The right and left ends 38R and 38L of the oil passage 38 are closed by the second member 34.

As illustrated in FIG. 10, the breather main body 22 is provided with first and second communication passages 23A and 23B through which the oil passage 38 and the inner space of the crankcase 50 are in communication with each other. As indicated by arrows Y1 in FIG. 10, oil that flows through the first communication passage 23A flows into the second communication passage 23B through the oil passage 38.

Figure 11:
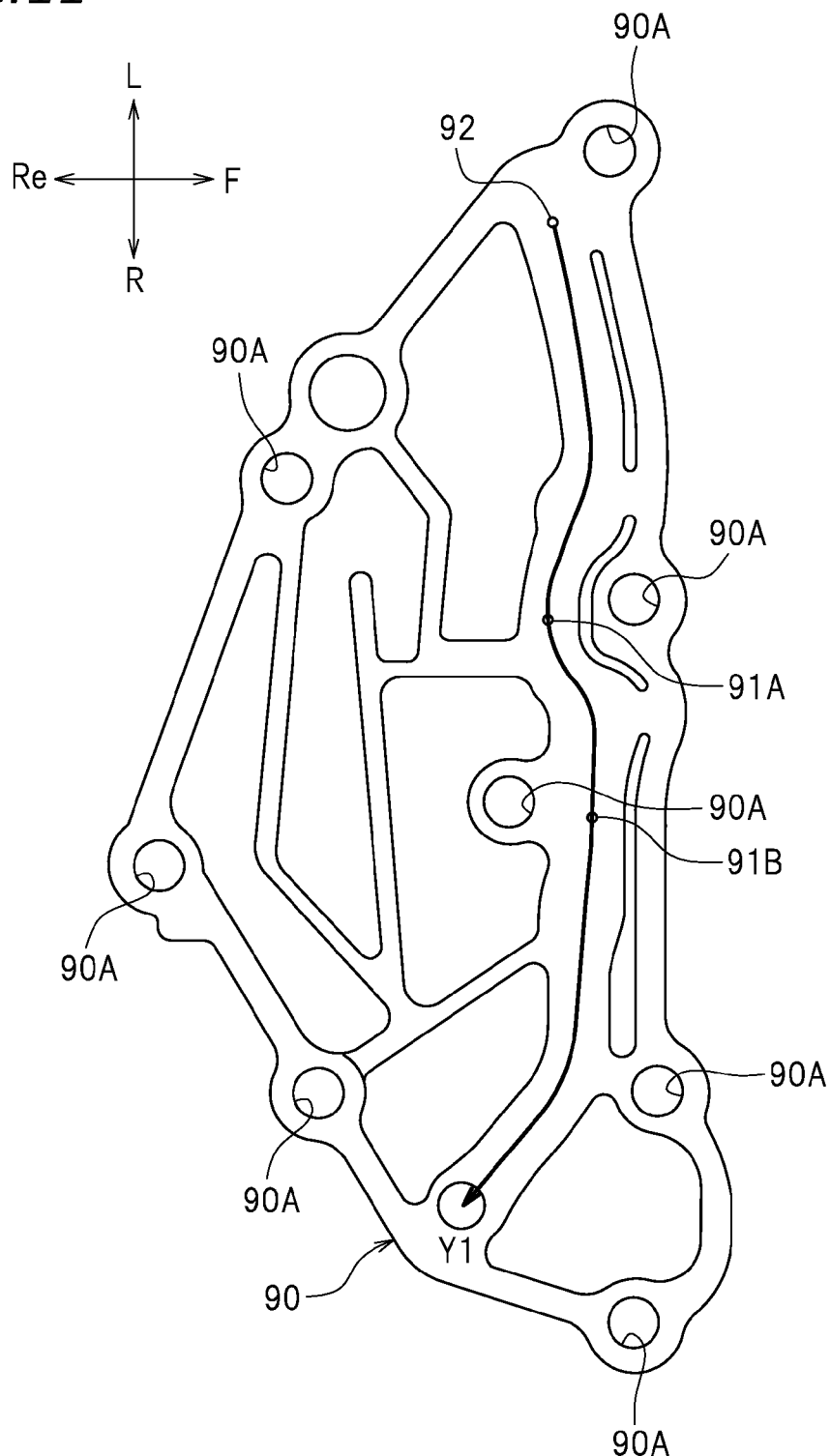
FIG. 11 is a plan view of a gasket according to the preferred embodiment of the present invention.

As illustrated in FIG. 11, the gasket 90 is provided with oil restriction holes 91A and 91B through which the first and second oil passages 39A and 39B are in communication with each other. Diameters of the oil restriction holes 91A and 91B are appropriately adjusted, thus adjusting an amount of oil that flows from the second oil passage 39B to the first oil passage 39A. The gasket 90 is further provided with an oil restriction hole 92 through which the first communication passage 23A and the second oil passage 39B are in communication with each other. A diameter of the oil restriction hole 92 is appropriately adjusted, thus adjusting an amount of oil that flows from the first communication passage 23A to the second oil passage 39B. The gasket 90 is further provided with bolt insertion holes 90A at positions corresponding to those of bolt insertion holes 94A and 94B (which will be described later). The bolt insertion holes 90A have shapes similar to those of the bolt insertion holes 94A and 94B. As indicated by arrows Y2 in FIG. 10, the oil that flows through the second oil passage 39B flows into the first oil passage 39A through the oil restriction holes 91A and 91B and is then guided into the oil feed holes 82A to 82C (which will be described later).

As illustrated in FIG. 10, the upper crankcase 52 is provided with the oil feed holes 82A, 82B and 82C. More specifically, the breather main body 22 is provided with the oil feed holes 82A to 82C. The oil passage 38 and the transmission chamber 60 are in communication with each other through the oil feed holes 82A to 82C. More specifically, the first oil passage 39A and the transmission chamber 60 are in communication with each other through the oil feed holes 82A to 82C. As illustrated in FIG. 9, the oil feed holes 82A to 82C are located higher than the main shaft 72 and the drive shaft 74. It is to be noted that the oil feed holes 82A to 82C may be located higher than at least one of the main shaft 72 and the drive shaft 74. The oil feed holes 82A to 82C are located rearward relative to the shaft center 72A of the main shaft 72. The oil feed holes 82A to 82C are located forward relative to a shaft center 74A of the drive shaft 74. Since the oil feed holes 82A to 82C are located rearward relative to the shaft center 72A of the main shaft 72 and located forward relative to the shaft center 74A of the drive shaft 74, oil is easily supplied to both of the main shaft 72 and the drive shaft 74. The main shaft 72 is disposed on an extension E1 of the oil feed hole 82B. A portion of the oil that has flowed into the first oil passage 39A flows in a direction indicated by an arrow X1 in FIG. 9 through the oil feed hole 82B, and is then supplied to the main shaft 72, the gears 72G and the shift fork 76. Most of the oil that flows through the oil feed hole 82B is supplied to a contact 73B (see FIG. 3) between the gear 72G and the shift fork 76. The drive shaft 74 is disposed on an extension E2 of the oil feed holes 82A and 82C. Another portion of the oil that has flowed into the first oil passage 39A flows in a direction indicated by an arrow X2 in FIG. 9 through the oil feed holes 82A and 82C, and is then supplied to the drive shaft 74, the gears 74G and the shift fork 76. Most of the oil that flows through the oil feed hole 82A is supplied to a contact 73A (see FIG. 3) between the gear 74G and the shift fork 76. Most of the oil that flows through the oil feed hole 82C is supplied to a contact 73C (see FIG. 3) between the gear 74G and the shift fork 76. As mentioned above, the oil feed holes 82A to 82C are located higher than the main shaft 72 and the drive shaft 74. Therefore, oil is dropped from the oil feed holes 82A to 82C, thus easily supplying the oil to the main shaft 72 and the drive shaft 74. In the present embodiment, the upper crankcase 52 is provided with the three oil feed holes, i.e., the oil feed holes 82A to 82C, but the number of the oil feed holes is not limited to three. Members to be disposed on the extensions of the oil feed holes 82A to 82C are not limited to those mentioned above. One of the main shaft 72 and the drive shaft 74 may be disposed laterally of the oil feed holes 82A to 82C, or may be disposed higher than the oil feed holes 82A to 82C. The oil feed holes 82A to 82C may be located forward relative to the shaft center 72A of the main shaft 72. The oil feed holes 82A to 82C may be located rearward relative to the shaft center 74A of the drive shaft 74.

As illustrated in FIG. 7, the breather main body 22 of the breather device 20 is provided with a plurality of the bolt insertion holes 94A. One of the bolt insertion holes 94A which will hereinafter be referred to as a "bolt insertion hole 95A" is disposed inside the enclosed space 26 of the breather device 20. An outer wall 95AA that defines the bolt insertion hole 95A is disposed inside the enclosed space 26. The bolt insertion hole 95A and the outer wall 95AA are located inside the third breather chamber 29C. The outer wall 95AA is connected to the first member 32. A groove 98 is provided between the bolt insertion hole 95A and the oil passage 38. As illustrated in FIG. 8, the breather cover 24 of the breather device 20 is provided with a plurality of the bolt insertion holes 94B. One of the bolt insertion holes 94B which will hereinafter be referred to as a "bolt insertion hole 95B" is disposed inside the enclosed space 26 of the breather device 20. An outer wall 95BB that defines the bolt insertion hole 95B is disposed inside the enclosed space 26. The bolt insertion hole 95B and the outer wall 95BB are located inside the third breather chamber 29C. The outer wall 95BB is connected to the second member 34. Bolts (not illustrated)

are inserted into the bolt insertion holes 94A and 94B and the bolt insertion holes 95A and 95B to fix the first and second members 32 and 34 to each other.

Figure 12:
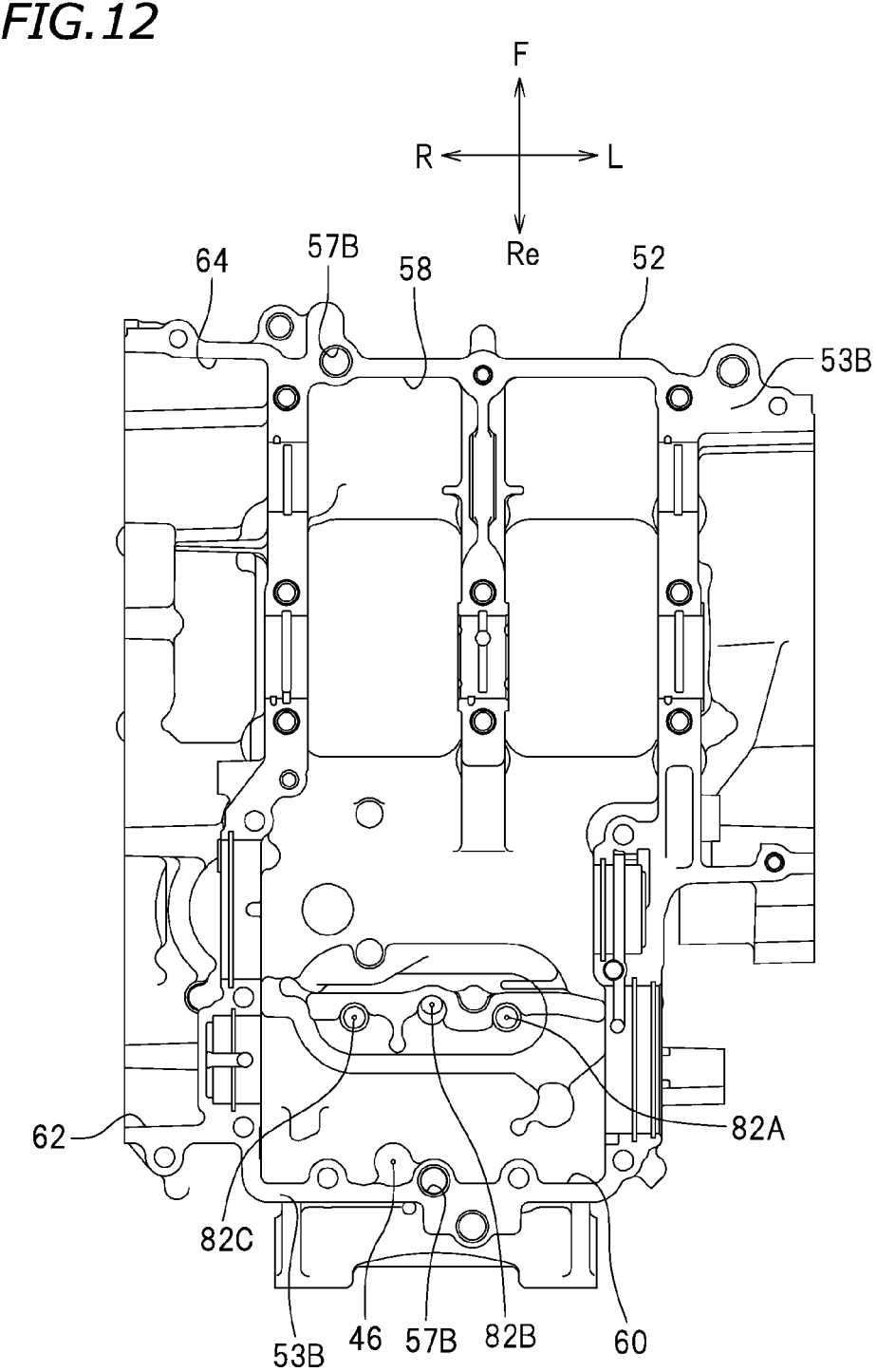
FIG. 12 is a bottom view of the upper crankcase according to the preferred embodiment of the present invention.
Figure 13:
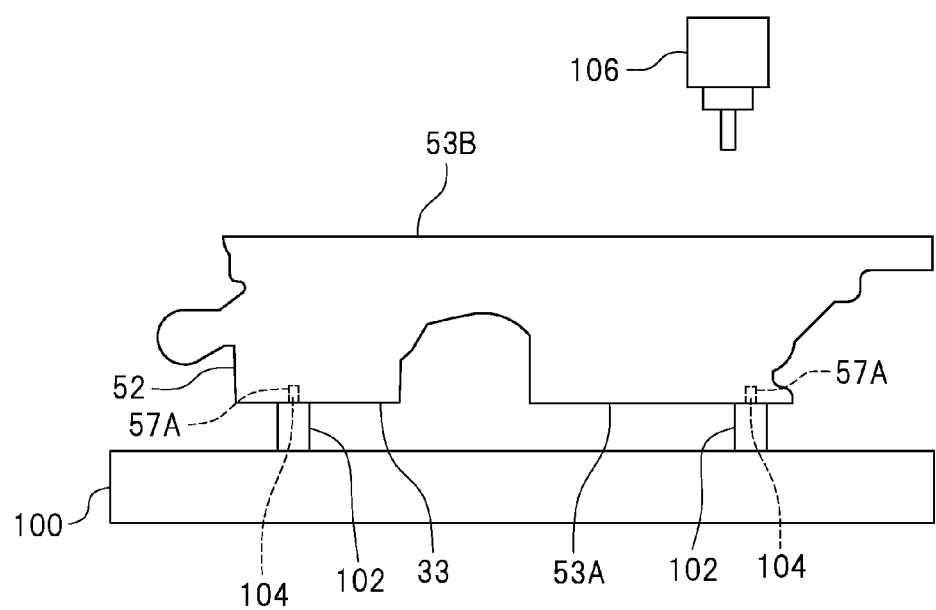
FIG. 13 is a side view schematically illustrating how an upper surface of the upper crankcase according to the preferred embodiment of the present invention is fixed onto a machine table to machine a lower surface of the upper crankcase.

As illustrated in FIG. 5, the upper crankcase 52 may include: the upper surface 33 that faces the lower surface 35 (see FIG. 8) of the second member 34; and an upper surface 53A that faces a lower surface 47A (see FIG. 4) of the cylinder body 47. As illustrated in FIG. 12, the upper crankcase 52 may further include a lower surface 53B that faces an upper surface 55A (see FIG. 15) of the lower crankcase 54 which will be described later. FIG. 13 is a diagram illustrating how the upper crankcase 52 that is turned upside down is fixed onto a machine table 100. As illustrated in FIG. 13, the lower surface 53B of the upper crankcase 52 is arranged so as to be substantially in parallel with the upper surface 33 and the upper surface 53A. A length of the upper crankcase 52 measured from the lower surface 53B to the upper surface 33 in the up-down direction is equal to a length of the upper crankcase 52 measured from the lower surface 53B to the upper surface 53A in the up-down direction.

As illustrated in FIG. 5, the upper surface 33 and the upper surface 53A of the upper crankcase 52 are each provided with a knock hole 57A. As illustrated in FIG. 13, knock pins 104 provided on fixtures 102 of the machine table 100 are inserted into the knock holes 57A, thus positioning the upper crankcase 52 onto the machine table 100. The lower surface 53B of the upper crankcase 52 fixed onto the machine table 100 is exposed to the outside. Therefore, the lower surface 53B of the upper crankcase 52 is easily machined by a drill 106.

Figure 14:
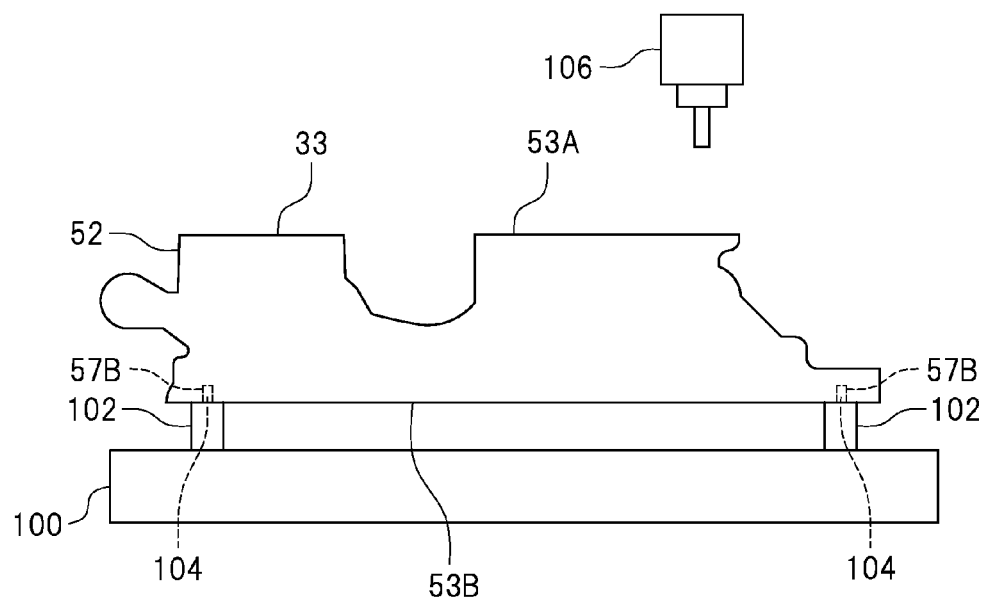
FIG. 14 is a side view schematically illustrating how the lower surface of the upper crankcase according to the preferred embodiment of the present invention is fixed onto the machine table to machine the upper surface of the upper crankcase.

As illustrated in FIG. 12, the lower surface 53B of the upper crankcase 52 is provided with a plurality of knock holes 57B. As illustrated in FIG. 14, the knock pins 104 provided on the fixtures 102 of the machine table 100 are inserted into the knock holes 57B, thus positioning the upper crankcase 52 onto the machine table 100. The upper surface 33 and the upper surface 53A of the upper crankcase 52 fixed onto the machine table 100 are exposed to the outside. Therefore, the upper surface 33 and the upper surface 53A of the upper crankcase 52 are easily machined by the drill 106.

Figure 15:
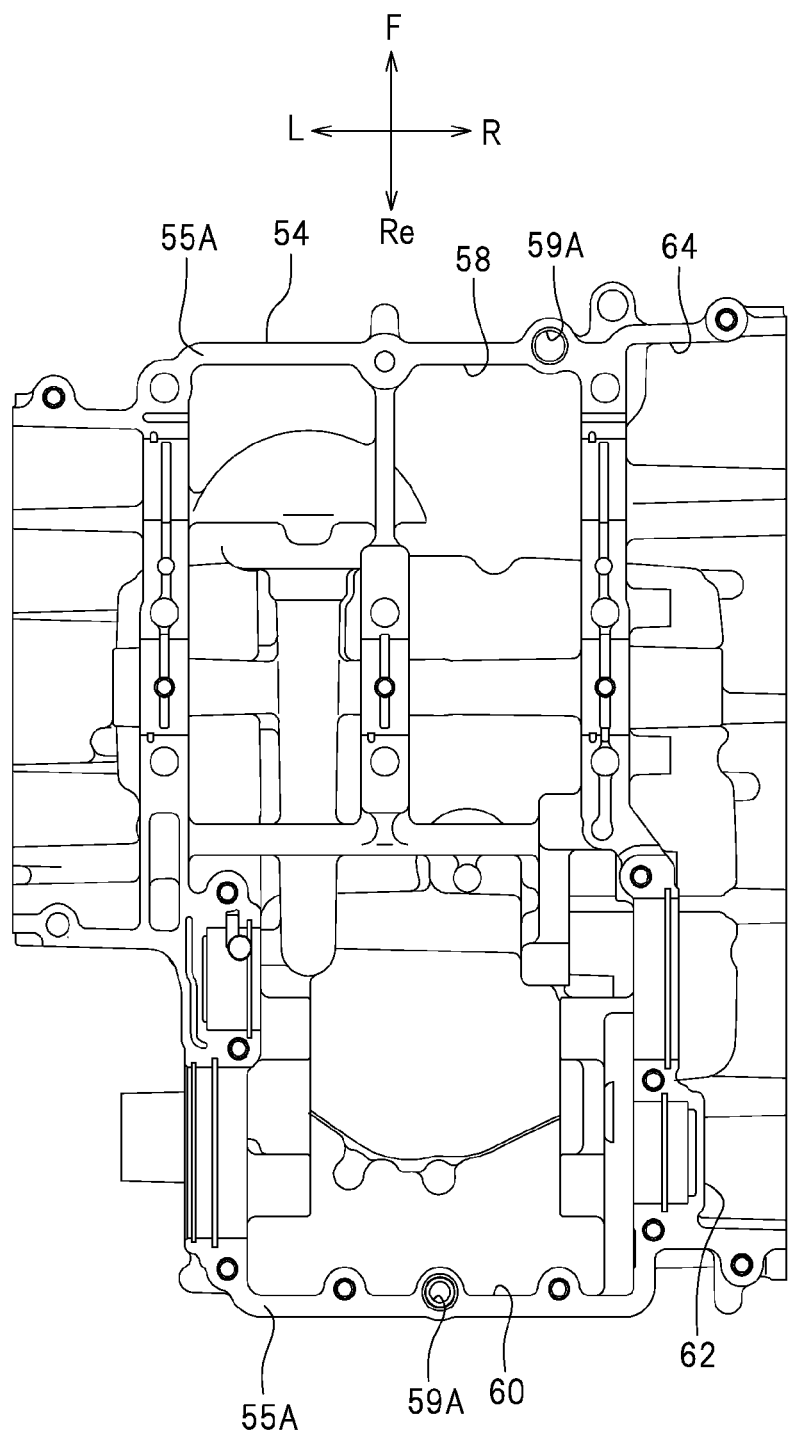
FIG. 15 is a plan view of a lower crankcase according to the preferred embodiment of the present invention.
Figure 16:
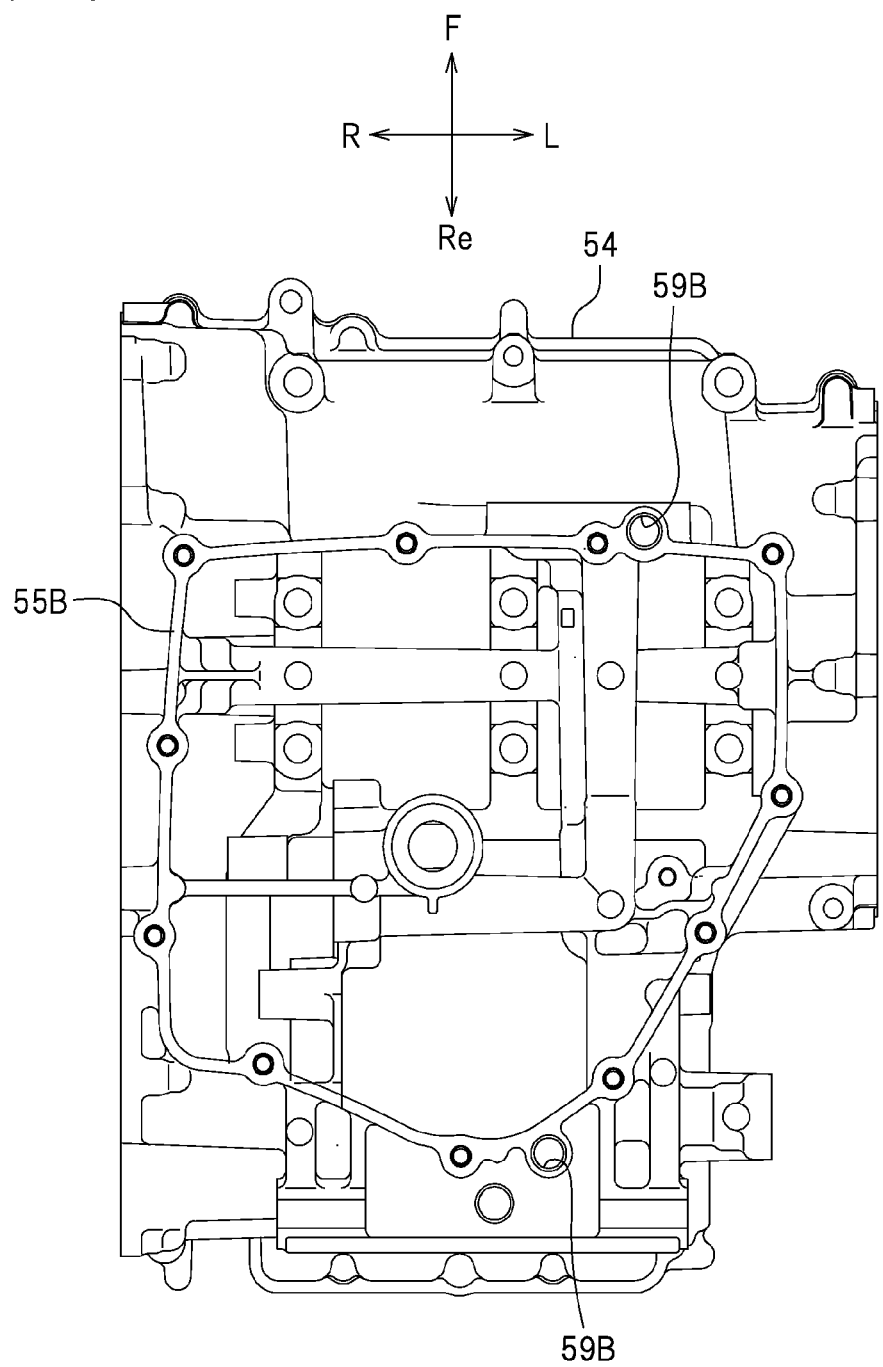
FIG. 16 is a bottom view of the lower crankcase according to the preferred embodiment of the present invention.
Figure 17:
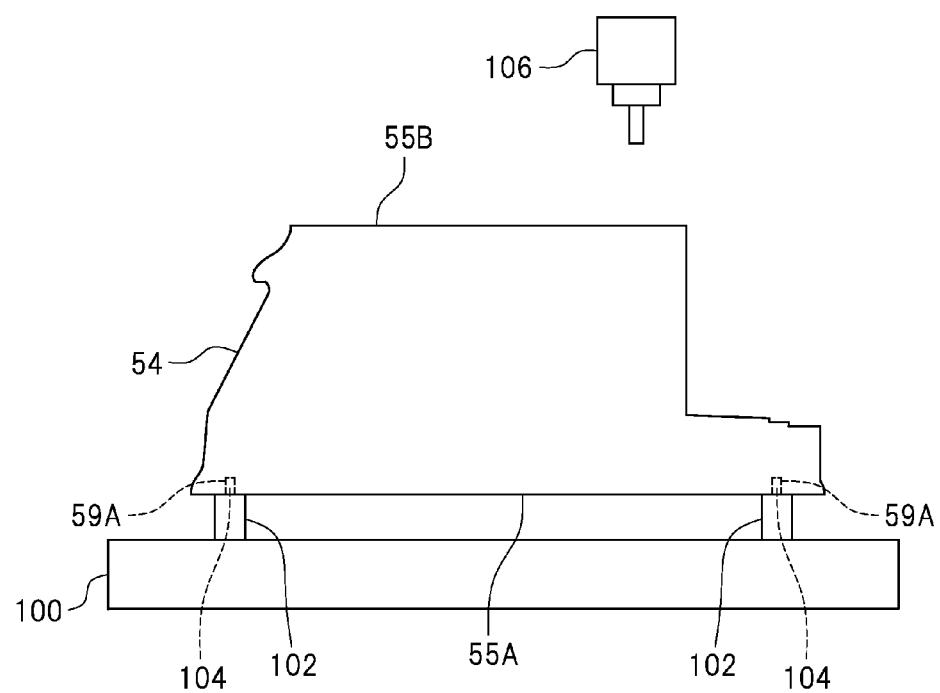
FIG. 17 is a side view schematically illustrating how an upper surface of the lower crankcase according to the preferred embodiment of the present invention is fixed onto the machine table to machine a lower surface of the lower crankcase.

As illustrated in FIG. 15, the lower crankcase 54 may include the upper surface 55A that faces the lower surface 53B (see FIG. 12) of the upper crankcase 52. As illustrated in FIG. 16, the lower crankcase 54 may further include a lower surface 55B that faces an upper surface (not illustrated) of the oil pan 56 (see FIG. 4). FIG. 17 is a diagram illustrating how the lower crankcase 54 that is turned upside down is fixed onto the machine table 100. As illustrated in FIG. 17, the upper surface 55A of the lower crankcase 54 is arranged so as to be substantially in parallel with the lower surface 55B.

As illustrated in FIG. 15, the upper surface 55A of the lower crankcase 54 is provided with a plurality of knock holes 59A. As illustrated in FIG. 17, the knock pins 104 provided on the fixtures 102 of the machine table 100 are inserted into the knock holes 59A, thus positioning the lower crankcase 54 onto the machine table 100. The lower surface 55B of the lower crankcase 54 fixed onto the machine table 100 is exposed to the outside. Therefore, the lower surface 55B of the lower crankcase 54 is easily machined by the drill 106.

Figure 18:
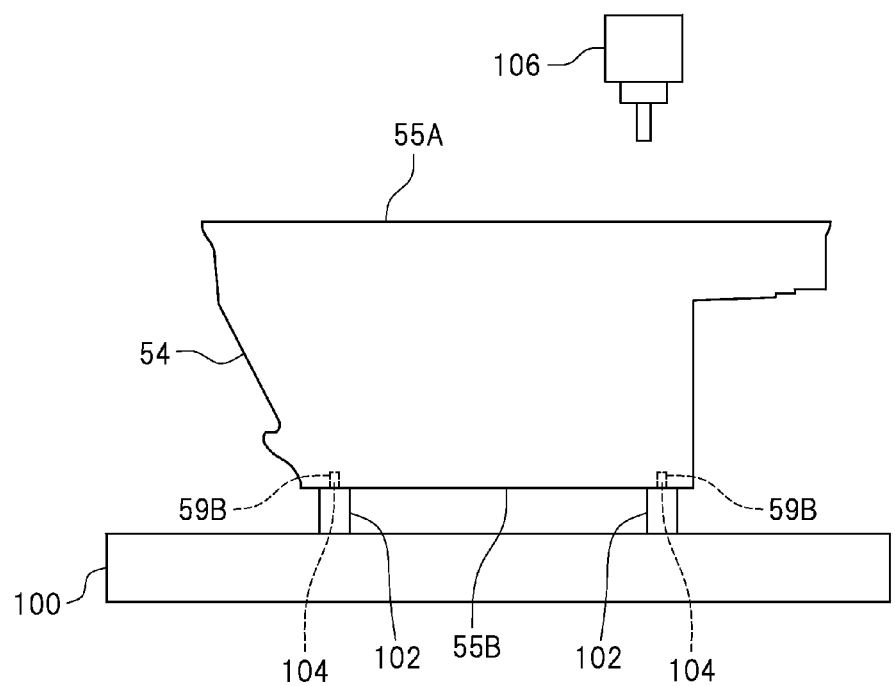
FIG. 18 is a side view schematically illustrating how the lower surface of the lower crankcase according to the preferred embodiment of the present invention is fixed onto the machine table to machine the upper surface of the lower crankcase.

As illustrated in FIG. 16, the lower surface 55B of the lower crankcase 54 is provided with a plurality of knock holes 59B. As illustrated in FIG. 18, the knock pins 104 provided on the fixtures 102 of the machine table 100 are inserted into the knock holes 59B, thus positioning the lower crankcase 54 onto the machine table 100. The upper surface 55A of the lower crankcase 54 fixed onto the machine table 100 is exposed to the outside. Therefore, the upper surface 55A of the lower crankcase 54 is easily machined by the drill 106.

As described above, in the engine 40 according to the present embodiment, the oil passage defining member 30 that defines the oil passage 38 is divided into the first and second members 32 and 34. The first member 32 is integral with the crankcase 50, and the second member 34 is separate from the crankcase 50. For example, when an oil pipe separate from the crankcase 50 is used as an oil passage defining member and assembled to the crankcase 50, the oil pipe has to be machined with high precision in order to ensure assembly precision. Hence, the cost of the oil pipe undesirably increases. However, according to the present embodiment, the first member 32, which is a portion of the oil passage defining member 30, is integral with the crankcase 50, and therefore, the first member 32 and the crankcase 50 do not cause an assembly error. The first member 32 does not have to be machined with precision as high as that required for the above-mentioned oil pipe. Consequently, the first member 32 is manufactured inexpensively. Thus, according to the present embodiment, the engine 40 is manufactured at a lower cost than when the entire oil passage 38, through which oil is supplied to components such as the main shaft 72 and the drive shaft 74, is separate from the crankcase 50.

For example, when an attempt is made to make the entire oil passage 38 integral with the crankcase 50, the oil passage defining member must be cast together with the crankcase 50. Unfortunately, since the oil passage 38 is a closed space through which oil flows, it is difficult to provide, with precision, the oil passage 38 having a shape other than a linear shape by casting. In such a case, the shape of the oil passage 38 is limited to a linear shape which is obtainable with precision by casting. However, according to the present embodiment, the second member 34, which is a portion of the oil passage defining member 30, is separate from the crankcase 50. The first and second members 32 and 34 are attached to each other so as to define the oil passage 38 that is a closed space, but before the first and second members 32 and 34 are attached to each other, portions of the first and second members 32 and 34 to be attached to each other have outwardly opened shapes. Thus, the first and second members 32 and 34 are manufactured more easily than when they each define a closed space. Hence, even when the oil passage 38 is to have a shape other than a linear shape, the oil passage 38 is cast with precision, thus allowing the oil passage 38 to have high flexibility in shape. Since the oil passage 38 has high flexibility in shape, flexibility of positions of the oil feed holes 82A to 82C to be provided is also increased. Therefore, the oil feed holes 82A to 82C are provided at suitable positions in the oil passage 38. As a result, oil is supplied to suitable positions of the main shaft 72, the gears 72G, the drive shaft 74, the gears 74G and the shift fork 76. In the present embodiment, the first member 32, the breather main body 22 and the upper crankcase 52 are cast in one piece, and the second member 34 and the breather cover 24 are cast in one piece. Alternatively, either one or both of the first and second members 32 and 34 may be provided by cutting. A method for providing the first and second members 32 and 34 is not limited to casting.

According to the present embodiment, the oil passage defining member 30 is disposed inside the breather device 20. Even if oil leaks from between the first and second members 32 and 34, the oil flows into the enclosed space 26 of the breather device 20. The first and second members 32 and 34 are firmly fixed to each other via the gasket 90 by using the bolts, which means that the first and second members 32 and 34 are designed so that no oil leaks from between the first and second members 32 and 34. If by any chance oil leaks from between the first and second members 32 and 34, the oil is prevented from leaking outside of the breather device 20. The oil that has flowed into the enclosed space 26 of the breather device 20 is returned to the crankcase 50 together with oil separated from the blowby gas. Therefore, it is unnecessary to additionally provide an oil return member to return oil that has leaked from between the first and second members 32 and 34. When the oil passage 38 is provided by assembling the first and second members 32 and 34 to each other, there may be concerns about adverse effects resulting from oil leakage from between the first and second members 32 and 34. However, according to the present embodiment, the oil passage defining member 30 is disposed inside the breather device 20, thus preventing occurrence of such adverse effects.

According to the present embodiment, oil is supplied to the shift fork 76 of the transmission 70 from the oil feed holes 82A to 82C. Hence, a frictional force between the shift fork 76 and the gears 72G and 74G is reduced, and therefore, it is unnecessary to apply hard plating to a surface of the shift fork 76 in order to prevent wearing away of the shift fork 76.

Accordingly, the present embodiment provides the engine 40 that allows the oil passage 38 to have high flexibility in shape while preventing increases in the number of components and manufacturing cost.

According to the present embodiment, as illustrated in FIG. 5, the oil passage defining member 30 serves, in the breather chamber 28, as a partition between: the first breather chamber 29A that includes the breather chamber inlet 27; and the second breather chamber 29B that is in communication with the first breather chamber 29A and that does not include the breather chamber inlet 27. When the blowby gas in the clutch chamber 62 flows into the breather chamber 28 through the breather chamber inlet 27, the oil flowing through the clutch chamber 62 might also flow into the breather chamber 28 together with the blowby gas. However, movement of most of the oil that will flow into the breather chamber 28 is inhibited by the oil passage defining member 30 located between the first and second breather chambers 29A and 29B. Therefore, the oil is inhibited from flowing into the second breather chamber 29B. Thus, the oil passage defining member 30 not only serves to define the oil passage 38 but also serves to inhibit the oil from flowing into the second breather chamber 29B.

According to the present embodiment, as illustrated in FIG. 4, the breather main body 22 is provided with the oil return hole 46 through which the breather chamber 28 and the transmission chamber 60 are in communication with each other. Thus, the oil separated from the blowby gas inside the breather chamber 28 is returned to the transmission chamber 60 without providing a separate pipe through which the breather chamber 28 and the transmission chamber 60 are in communication with each other. The oil return hole 46 is located lower than the connection position 85 between the first and second members 32 and 34. As a result, even if oil leaks from between the first and second members 32 and 34, the oil is returned to the transmission chamber 60.

As illustrated in FIG. 5, the oil passage defining member 30 may include the bent portion 31B, and therefore, oil is inhibited from flowing into the second breather chamber 29B from the first breather chamber 29A. The first breather chamber 29A needs to have a certain volume so that the blowby gas easily flows into the breather chamber 28 from the clutch chamber 62. In the present embodiment, the volume of the first breather chamber 29A is larger than that of the second breather chamber 29B. Alternatively, the volume of the first breather chamber 29A may be equal to that of the second breather chamber 29B or may be smaller than that of the second breather chamber 29B. In the present embodiment, the volume of the first breather chamber 29A is larger than when the entire oil passage defining member has a linear shape without any bent portion. Therefore, the blowby gas easily flows into the first breather chamber 29A from the clutch chamber 62. Since the oil passage defining member 30 does not have a linear shape as a whole and is provided with the bent portion 31B, a dimension of the oil passage defining member 30 in a vehicle width direction is reduced. As a result, the oil passage defining member 30 is compactly disposed. Note that when the clutch chamber 62 is located leftward of the oil passage defining member 30, the oil passage defining member 30 may have a bent portion that bends rearward as it extends leftward.

According to the present embodiment, as illustrated in FIG. 4, the lower surface 28A of the breather chamber 28 is inclined with respect to the horizontal direction so that the lower surface 28A extends downward as it extends rearward from the oil passage 38. Thus, the oil separated from the blowby gas inside the breather chamber 28 is easily guided into the oil return hole 46. Even if oil leaks from between the first and second members 32 and 34, the oil is smoothly returned to the transmission chamber 60 through the oil return hole 46.

According to the present embodiment, as illustrated in FIG. 7, the first member 32 may include the upper surface 33. As illustrated in FIG. 8, the second member 34 may include the lower surface 35 that faces the upper surface 33. Thus, the oil passage 38 defined by the first and second members 32 and 34 is easily provided, thus increasing layout flexibility of the oil passage 38. In the present embodiment, the oil passage 38 extends horizontally, and the upper surface 33 and the lower surface 35 are substantially in parallel with an axis of the oil passage 38. When the upper surface 33 and the lower surface 35 are substantially in parallel with the axis of the oil passage 38 in this manner, upper and lower portions of the oil passage 38 are entirely exposed before the first and second members 32 and 34 are assembled to each other. Hence, even the oil passage 38 having the bent portion is easily provided, thus increasing layout flexibility of the oil passage 38. Although the upper surface 33 and the lower surface 35 are horizontal surfaces in the present embodiment, the upper surface 33 and the lower surface 35 may be inclined with respect to a horizontal plane.

According to the present embodiment, as illustrated in FIG. 10, the first oil passage 39A through which oil flows is defined by the first member 32 and the gasket 90, and the second oil passage 39B through which oil flows is defined by the second member 34 and the gasket 90. The gasket 90 is provided with the oil restriction holes 91A and 91B (see FIG. 11) through which the first and second oil passages 39A and 39B are in communication with each other. Thus, a flow rate of the oil that flows from the second oil passage 39B into the first oil passage 39A is adjusted through the oil restriction holes 91A and 91B provided in the gasket 90. The oil in the first oil passage 39A is supplied to the transmission 70 through the oil feed holes 82A to 82C. According to the present embodiment, an amount of the oil to be supplied to the transmission 70 is adjusted by a simple method in which, for example, shapes or sizes of the oil restriction holes 91A and 91B of the gasket 90 are appropriately adjusted or the number of the oil restriction holes to be provided in the gasket 90 is appropriately adjusted.

According to the present embodiment, as illustrated in FIG. 7, the breather main body 22 is provided with the bolt insertion hole 95A into which a bolt is inserted to fix the first and second members 32 and 34 to each other. The outer wall 95AA that defines the bolt insertion hole 95A is disposed inside the enclosed space 26. By fixing the first and second members 32 and 34 to each other with the bolt, a contact pressure applied to the gasket 90 located between the first and second members 32 and 34 is increased, thus enhancing sealing ability of the oil passage 38. As a result, oil leakage from between the first and second members 32 and 34 is inhibited.

The bolt is inserted into the bolt insertion hole 95A of the breather main body 22 and the bolt insertion hole 95B of the breather cover 24, thus positioning the first and second members 32 and 34 and assembling the first and second members 32 and 34 to each other with precision. As a result, the oil passage 38 is provided with precision.

According to the present embodiment, as illustrated in FIG. 9, the second member 34 is integral with the breather cover 24. The second member 34 and the breather cover 24 are integral with each other in this manner, thus reducing the number of components and resulting in a cost reduction. Alternatively, the second member 34 and the breather cover 24 may be separate components.

According to the present embodiment, as illustrated in FIG. 7, the first member 32 is disposed inside the breather main body 22, and the groove 96 is provided between the first member 32 and the inner wall 22A of the breather main body 22. Thus, even when oil leaks out from between the first and second members 32 and 34, the oil flows into the groove 96. As a result, the oil is prevented from leaking outside of the breather device 20.

The first member 32 defines a portion of the outer wall 22B of the breather main body 22. Thus, the first member 32 is provided easily and simplified in structure.

The oil feed holes 82A to 82C are located higher than the main shaft 72 and the drive shaft 74. Therefore, oil is dropped from the oil feed holes 82A to 82C, thus easily supplying the oil to the main shaft 72 and the drive shaft 74 which are located lower than the oil feed holes 82A to 82C.

The shape of the oil passage 38 is not limited to any particular shape. The oil passage 38 may have a portion curved along its axial direction or may have a portion bent along its axial direction. A lateral width of the oil passage 38 may or may not be constant. A cross-sectional shape of the oil passage 38 may be circular or noncircular. The cross-sectional shape of the oil passage 38 may be elliptical or rectangular. The oil passage 38 may have a branch portion that branches off from somewhere along the oil passage 38.

As illustrated in FIG. 7, the bolt insertion hole 95A is disposed behind and close to the oil passage 38. The bolt insertion hole 95A is disposed rearward relative to a front end of the oil passage 38 and forward relative to a rear end of the oil passage 38. The first and second members 32 and 34 are fixed to each other with the bolts inserted into the bolt insertion holes 94A located in front of and close to the oil passage 38, and the bolt inserted into the bolt insertion hole 95A located behind and close to the oil passage 38. As a result, portions of the first and second members 32 and 34 which are adjacent to the oil passage 38 are bolted to each other, thus inhibiting oil leakage from between the first and second members 32 and 34.

The first and second members 32 and 34 are assembled to each other so that the upper surface 33 of the first member 32 and the lower surface 35 of the second member 34 face each other, with the gasket 90 interposed therebetween. In other words, the first and second members 32 and 34 are brought into surface contact with each other, with the gasket 90 interposed therebetween. Therefore, even if the first and second members 32 and 34 are slightly horizontally misaligned relative to each other when the first and second members 32 and 34 are assembled to each other, no blockage occurs in the oil passage 38, and in addition, oil leakage from between the first and second members 32 and 34 is prevented.

The terms and expressions used herein are used for explanation purposes and should not be construed as being restrictive. It should be appreciated that the terms and expressions used herein do not eliminate any equivalents of features illustrated and mentioned herein, and allow various modifications falling within the claimed scope of the present invention. The present invention may be embodied in many different forms. The present disclosure is to be considered as providing examples of the principles of the present invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

The invention claimed is:

1. An engine, comprising:
   a crankcase including a transmission chamber;
   a crankshaft disposed in the crankcase;
   a transmission, including
      a main shaft that is disposed in the transmission chamber of the crankcase and is configured to receive a driving force from the crankshaft to thereby rotate, and
      a drive shaft that is disposed in the transmission chamber of the crankcase and is configure to receive a driving force from the main shaft to thereby rotate;
   a breather device, including
      a breather main body integral with the crankcase, and
      a breather cover separate from the breather main body and configure to attach to the breather main body,
   the breather main body and the breather cover defining an enclosed space in communication with an inner space of the crankcase, the breather device being arranged to separate oil contained in blowby gas flowing into the enclosed space and return the separated oil to the crankcase; and
      an oil passage defining member disposed in the breather device, including
         a first member integral with the crankcase, and
         a second member separate from the first member and configure to attach to the first member,
   the first member and the second member defining an oil passage through which the oil flows, the oil passage being in communication with the transmission chamber through an oil feed hole of the crankcase, the oil being supplied to the transmission through the oil feed hole.

2. The engine according to claim 1, further comprising a clutch to which a torque of the crankshaft is transmitted;
- wherein the breather device further includes a breather chamber, through which the oil contained in the blowby gas is separated, formed in the enclosed space;
- wherein the crankcase further includes:
    - a clutch chamber in which the clutch is disposed and through which the oil flows, and
    - a breather chamber inlet through which the clutch chamber and the breather chamber are in communication with each other and the blowby gas is guided from the clutch chamber to the breather chamber, and
- wherein the oil passage defining member partitions the breather chamber into
    - a first breather chamber that includes the breather chamber inlet, and
    - a second breather chamber that is in communication with the first breather chamber and that does not include the breather chamber inlet.

3. The engine according to claim 2,
- wherein the breather main body includes an oil return hole formed therein, through which the breather chamber and the transmission chamber are in communication with each other, the oil return hole being located lower than a connection position between the first member and the second member of the oil passage defining member.

4. The engine according to claim 3,
- wherein a lower surface of the breather chamber extends downward as the lower surface extends from the oil passage toward the oil return hole.

5. The engine according to claim 2, wherein
- the main shaft includes a first end portion and a second end portion,
- the clutch is attached to the second end portion of the main shaft,
- the oil passage defining member extends from a first end portion of the breather device, adjacent to the first end portion of the main shaft, toward a second end portion of the breather device adjacent to the second end portion of the main shaft, and
- the oil passage defining member includes a bent portion that extends away from the clutch, in a direction substantially perpendicular to the main shaft, as the bent portion extends toward the second end portion of the breather device adjacent to the second end portion.

6. The engine according to claim 1, wherein
- the first member of the oil passage defining member includes an upper surface, and
- the second member of the oil passage defining member includes a lower surface that faces the upper surface.

7. The engine according to claim 6, further comprising a gasket located between the upper surface and the lower surface, wherein
- the first member of the oil passage defining member and the gasket define a first oil passage through which the oil flows,
- the second member of the oil passage defining member and the gasket define a second oil passage through which the oil flows,
- the oil feed hole is in communication with the first oil passage, and
- the gasket includes an oil restriction hole formed therein, through which the first oil passage and the second oil passage are in communication with each other.

8. The engine according to claim 7, wherein
- the breather device includes a bolt insertion hole formed therein, into which a bolt is insertable to fix the first member and the second member to each other, and
- an outer wall that defines the bolt insertion hole is disposed in the enclosed space.

9. The engine according to claim 1,
- wherein the second member of the oil passage defining member is integral with the breather cover.

10. The engine according to claim 1, wherein
- the first member of the oil passage defining member is disposed in the breather main body, and
- a groove is formed between the first member and an inner wall of the breather main body.

11. The engine according to claim 1,
- wherein the first member of the oil passage defining member defines a portion of an outer wall of the breather main body.

12. The engine according to claim 1,
- wherein the oil feed hole is located higher than at least one of the main shaft and the drive shaft.

13. A straddle-type vehicle, comprising the engine of claim 1.

* * * * *